United States Patent [19]

Marler et al.

[11] Patent Number: 5,288,395

[45] Date of Patent: * Feb. 22, 1994

[54] PRODUCTION OF HIGH VISCOSITY INDEX LUBRICANTS

[75] Inventors: David O. Marler, Deptford; Dominick N. Mazzone, Wenonah, both of N.J.

[73] Assignee: Mobil Oil Corporation, Fairfax, Va.

[*] Notice: The portion of the term of this patent subsequent to Jan. 25, 2011 has been disclaimed.

[21] Appl. No.: 734,826

[22] Filed: Jul. 24, 1991

[51] Int. Cl.$^5$ .................... C10G 67/02; C10G 69/02
[52] U.S. Cl. ........................... 208/58; 208/49; 208/27
[58] Field of Search .................. 208/58, 49, 27

[56] References Cited

U.S. PATENT DOCUMENTS

| | | | |
|---|---|---|---|
| 3,884,835 | 5/1975 | Vaughan | 252/451 |
| 4,091,079 | 5/1978 | Vaughan | 423/328 |
| 4,673,559 | 6/1987 | Derouane et al. | 423/329 |
| 4,791,088 | 12/1988 | Chu et al. | 502/232 |
| 4,880,611 | 11/1989 | von Ballmoos et al. | 423/306 |
| 4,919,788 | 4/1990 | Chen et al. | 208/49 |
| 4,975,177 | 12/1990 | Garwood et al. | 208/27 |
| 5,105,051 | 4/1992 | Perlrine | 585/528 |
| 5,118,894 | 6/1992 | Quangle | 585/446 |

OTHER PUBLICATIONS

Szostak, Zeilites, Facts, Figures, Futures, Ed. Jacobs et al. Elsevier Science Publ.bV, 1989, pp. 439–446.

*Primary Examiner*—Helane Myers
*Attorney, Agent, or Firm*—A. J. McKillop; M. D. Keen

[57] ABSTRACT

Petroleum wax feeds are converted to high viscosity index lubricants by a two-step hydrocracking-hydroisomerization process in which the wax feed is initially subjected to hydrocracking under mild conditions with a conversion to non-lube range products of no more than about 40 weight percent of the feed. The hydrocracking is carried out at a hydrogen pressure of at least 1,000 psig (7,000 kPa) using an amorphous or mesoporous crystalline catalyst which preferentially removes the aromatic components present in the initial feed. The hydrocracked effluent is then subjected to hydroisomerization in a second step using a low acidity hydroisomerization catalyst which effects a preferential isomerization on the paraffin components to less waxy, high VI isoparaffins. The second stage, which is carried out at relatively low temperature, typically from 600° to 650° F. with a 650° F.+ conversion in the range of 10 to 20 weight percent of the second stage feed but with high selectivity for isomerization of the paraffins, is carried out in the presence of a catalyst which contains a hydrogenation component, preferably a noble metal such as platinum, on a mesoporous support material. The mesoporous support material (for the first or second steps) comprises an inorganic, non-layered, porous, crystalline phase aluminosilicate material which exhibits a benzene adsorption capacity of greater than about 15 grams benzene per 100 grams at 50 torr and 25° C. and which, in its preferred catalytic form, has a uniform, hexagonal arrangement of pores with diameters of at least about 13 Å and exhibiting, after calcination, an X-ray diffraction pattern with at least on d-spacing greater than about 18 Å and a hexagonal electron diffraction pattern that can be indexed with a $d_{100}$ value greater than about 18 Å which corresponds to at least one peak in the X-ray diffraction pattern.

40 Claims, 1 Drawing Sheet

PRODUCTION OF HIGH VISCOSITY INDEX LUBRICANTS

CROSS REFERENCE TO RELATED APPLICATIONS

This application is related to co-pending applications Ser. Nos. 07/548,701 now abandoned and 07/548,702 now abandoned which relate to the production of high viscosity index lubricants from petroleum wax feeds. It is also related to application Ser. No. 07/734,971, filed concurrently, which relates to lube hydrocracking over catalysts based on mesoporous crystalline materials. The mesoporous crystalline materials used in the present process are described in application Ser. No. 07/625,425, filed Dec. 10, 1990, now U.S. Pat. No. 5,098,684 which is a continuation-in-part of Ser. No. 07/470,008, filed Jan. 25, 1990, now U.S. Pat. No. 5,102,143.

FIELD OF THE INVENTION

This invention relates to the production of high viscosity index lubricants by hydrocracking mineral oil feedstocks, especially petroleum waxes.

BACKGROUND OF THE INVENTION

Mineral oil based lubricants are conventionally produced by a separative sequence carried out in the petroleum refinery which comprises fractionation of a paraffinic crude oil under atmospheric pressure followed by fractionation under vacuum to produce distillate fractions (neutral oils) and a residual fraction which, after deasphalting and severe solvent treatment may also be used as a lubricant basestock usually referred to as bright stock. Neutral oils, after solvent extraction to remove low viscosity index (V.I.) components are conventionally subjected to dewaxing, either by solvent or catalytic dewaxing processes, to the desired pour point, after which the dewaxed lubestock may be hydrofinished to improve stability and remove color bodies. This conventional technique relies upon the selection and use of crude stocks, usually of a paraffinic character, which produce the desired lube fractions of the desired qualities in adequate amounts. The range of permissible crude sources may, however, be extended by the lube hydrocracking process which is capable of utilizing crude stocks of marginal or poor quality, usually with a higher aromatic content than the best paraffinic crudes. The lube hydrocracking process, which is well established in the petroleum refining industry, generally comprises an initial hydrocracking step carried out under high pressure in the presence of a bifunctional catalyst which effects partial saturation and ring opening of the aromatic components which are present in the feed. The hydrocracked product is then subjected to dewaxing in order to reach the target pour point since the products from the initial hydrocracking step which are paraffinic in character include components with a relatively high pour point which need to be removed in the dewaxing step.

Current trends in the design of automotive engines are associated with higher operating temperatures as the efficiency of the engines increases and these higher operating temperatures require successively higher quality lubricants. One of the requirements is for higher viscosity indices (V.I.) in order to reduce the effects of the higher operating temperatures on the viscosity of the engine lubricants. High V.I. values have conventionally been attained by the use of V.I. improvers e.g. polyacrylates, but there is a limit to the degree of improvement which may be effected in this way; in addition, V.I. improvers tend to undergo degradation under the effects of high temperatures and high shear rates encountered in the engine, the more stressing conditions encountered in high efficiency engines result in even faster degradation of oils which employ significant amounts of V.I. improvers. Thus, there is a continuing need for automotive lubricants which are based on fluids of high viscosity index and which are stable to the high temperature, high shear rate conditions encountered in modern engines.

Synthetic lubricants produced by the polymerization of olefins in the presence of certain catalysts have been shown to possess excellent V.I. values, but they are expensive to produce by the conventional synthetic procedures and usually require expensive starting materials. There is therefore a need for the production of high V.I. lubricants from mineral oil stocks which may be produced by techniques comparable to those presently employed in petroleum refineries.

In theory, as well as in practice, lubricants should be highly paraffinic in nature since paraffins possess the desirable combination of low viscosity and high viscosity index. Normal paraffins and slightly branched paraffins e.g. n-methyl paraffins, are waxy materials which confer an unacceptably high pour point on the lube stock and are therefore removed during the dewaxing operations in the conventional refining process described above. It is, however, possible to process waxy feeds in order to retain many of the benefits of their paraffinic character while overcoming the undesirable pour point characteristic. A severe hydrotreating process for manufacturing lube oils of high viscosity index is disclosed in *Developments in Lubrication* PD 19(2), 221–228, S. Bull et al, and in this process, waxy feeds such as waxy distillates, deasphalted oils and slack waxes are subjected to a two-stage hydroprocessing operation in which an initial hydrotreating unit processes the feeds in blocked operation with the first stage operating under higher temperature conditions to effect selective removal of the undesirable aromatic compounds by hydrocracking and hydrogenation. The second stage operates under relatively milder conditions of reduced temperature at which hydrogenation predominates, to adjust the total aromatic content and influence the distribution of aromatic types in the final product. The viscosity and flash point of the base oil are then controlled by topping in a subsequent redistillation step after which the pour point of the final base oil is controlled by dewaxing in a solvent dewaxing (MEK-toluene) unit. The slack waxes removed from the dewaxer may be reprocessed to produce a base oil of high viscosity index.

Processes of this type, employing a waxy feed which is subjected to hydrocracking over an amorphous bifunctional catalyst such as nickel-tungsten on alumina or silica-alumina are disclosed, for example, in British Patents Nos. 1,429,494, 1,429,291 and 1,493,620 and U.S. Pat. Nos. 3,830,273, 3,776,839, 3,794,580, and 3,682,813. In the process described in GB 1,429,494, a slack wax produced by the dewaxing of a waxy feed is subjected to hydrocracking over a bifunctional hydrocracking catalyst at hydrogen pressures of 2,000 psig of higher, followed by dewaxing of the hydrocracked product to obtain the desired pour point. Dewaxing is stated to be preferably carried out by the solvent process with recycle of the separated wax to the hydrocracking step.

In processes of this kind, the hydrocracking catalyst is typically a bifunctional catalyst containing a metal hydrogenation component on an amorphous acidic support. The metal component is usually a combination of base metals, with one metal selected from the iron group (Group VIII) and one metal from Group VIB of the Periodic Table, for example, nickel in combination with molybdenum or tungsten. Modifiers such as phosphorus or boron may be present, as described in GB 1,350,257, GB 1,342,499, GB 1,440,230, FR 2,123,235, FR 2,124,138 and EP 199,394. Boron may also be used as a modifier as described in GB 1,440,230. The activity of the catalyst may be increased by the use of fluorine, either by incorporation into the catalyst during its preparation in the form of a suitable fluorine compound or by in situ fluoriding during the operation of the process, as disclosed in GB 1,390,359.

Although the process using an amorphous catalyst for the treatment of the waxy feeds has shown itself to be capable of producing high V.I. lubricants, it is not without its limitations. At best, the technique requires a significant dewaxing capability, both in order to produce the feed as well as to dewax the hydrocracked product to the desired pour point. The reason for this is that although the amorphous catalysts are effective for the saturation of the aromatics under the high pressure conditions which are typically used (about 2,000 psig) their activity and selectivity for isomerization of the paraffinic components is not as high as might be desired; the relatively straight chain paraffins are not, therefore, isomerized to the less waxy isoparaffins of relatively high viscosity index but with low pour point properties, to the extent required to fully meet product pour point specifications. The waxy paraffins which pass through the unit therefore need to be removed during the subsequent dewaxing step and recycled, thus reducing the capacity of the unit. The restricted isomerization activity of the amorphous catalysts also limits the single-pass yields to a value below about 50 percent, with the corresponding wax conversion being about 30 to 60%, even though higher yields would obviously enhance the efficiency of the process. The product VI is also limited by the isomerization activity, typically to about 145° at 0° F. pour point in single pass operation. The temperature requirement of the amorphous catalysts is also relatively high, at least in comparison to zeolite catalysts, typically being about 700°-800° F.

Another approach to the upgrading of waxy feeds to high V.I. lubricant basestocks is disclosed in U.S. Pat. Nos. 4,919,788 and 4,975,177. In this process, a waxy feed, typically a waxy gas oil, a slack wax, or a deoiled wax, is hydroprocessed over a highly siliceous zeolite beta catalyst. Zeolite beta is known to be highly effective for the isomerization of paraffins in the presence of aromatics, as reported in U.S. Pat. No. 4,419,220, and its capabilities are effectively exploited in the process of U.S. Pat. No. 4,919,788 and 4,975,177 in a manner which optimizes the yield and viscometric properties of the products. The zeolite beta catalyst isomerizes the high molecular weight paraffins contained in the back end of the feed to less waxy materials while minimizing cracking of these components to materials boiling outside the lube range. The waxy paraffins in the front end of the feed are removed in a subsequent dewaxing step, either solvent or catalytic, in order to achieve the target pour point. The combination of paraffin hydroisomerization with the subsequent selective dewaxing process on the front end of the feed is capable of achieving higher product V.I. values than either process on its own and, in addition, the process may be optimized either for yield efficiency or for V.I. efficiency, depending upon requirements.

While this zeolite-catalyzed process has shown itself to be highly effective for dealing with highly paraffinic feeds, the high isomerization selectivity of the zeolite beta catalysts, coupled with its lesser capability to remove low quality aromatic components, has tended to limit the application of the process to feeds which contain relatively low quantities of aromatics: the aromatics as well as other polycyclic materials are less readily attacked by the zeolite with the result that they pass through the process and remain in the product with a consequent reduction in V.I. The lube yield also tends to be constrained by the low wax isomerisation selectivity at low conversions and by wax cracking out of the lube boiling range at high conversions: maximum lube yields are typically obtained in the 20 to 30 weight percent conversion range (650° F.+ conversion). It would therefore be desirable to increase isomerization selectivity and simultaneously to reduce hydrocracking selectivity in order to improve lube yield while retaining the high VI numbers in the product.

In summary, therefore, the processes using amorphous catalysts can be regarded as inferior in terms of single pass conversion and overall yield because the amorphous catalysts are relatively non-selective for paraffin isomerization in the presence of polycyclic components but have a high activity for cracking so that overall yield remains low and dewaxing demands are high. The zeolite-catalyzed process, by contrast, is capable of achieving higher yields since the zeolite has a much higher selectivity for paraffin isomerization but under the moderate hydrogen pressures used in the process, the aromatics are not effectively dealt with in lower quality feeds and operation is constrained by the differing selectivity factors of the zeolite at different conversion levels.

SUMMARY OF THE INVENTION

We have now devised a process for producing high quality, high viscosity index (V.I.) lubricants by a two-stage wax hydrocracking-hydroisomerization process. The process is capable of producing products with high viscosity indices above 110 and typically above about 140, usually in the range of 140 to 155. With the preferred high wax content feeds (more than 50 percent wax), products with VI values of 143 to 147 may readily be obtained. Lube product yields are high and the dewaxing requirement for the product is markedly lower due to the effectiveness of the process in converting the waxy paraffins, mainly linear and near linear paraffins, to less waxy isoparaffins of high viscosity index. Compared to the zeolite-catalyzed hydroisomerization process, it has the advantage of being able to accommodate a wider range of feeds at constant product quality since it is more effective for the removal of the low quality aromatic components from the feed; it also provides a yield advantage in the range where maximum lube yield is obtained (about 20-30% conversion) as well as providing a higher product VI across a wide conversion range from about 5 to 40 percent conversion (to non-lube range products, typically 650° F.-products).

According to the present invention, the waxy feed is subjected to a two-stage I hydrocracking-hydroisomerization. In the first stage, the feed is subjected to hydroprocessing over a bifunctional catalyst comprising a metal hydrogenation component on a porous support material under relatively mild conditions of limited conversion. The second stage comprises a hydroisomerization step which is carried out over a metal-containing bifunctional catalyst of relatively low acidity. The catalyst used in this stage has a support which comprises a mesoporous crystalline material of unique structure and pore geometry. The stages may be operated separately with interstage light gas and naphtha separation or, alternatively, in direct cascade mode. The process is particularly well suited to the upgrading of high boiling point slack waxes such as heavy neutral waxes and petrolatum slack waxes, with oil contents greater than about 10 weight percent, for example, about 15 weight percent or greater. The products include high viscosity, very high viscosity index lubricating oils.

In the first stage of the process, the feed is subjected to mild hydrocracking over a lube hydrocracking catalyst. In this step, the low quality aromatic components of the feed are subjected to hydrocracking reactions which result in complete or partial saturation of aromatic rings accompanied by ring opening reactions to form products which are relatively more paraffinic; the limited conversion in the first stage, however, enables these products to be retained without undergoing further cracking to products boiling below the lube boiling range, typically below about 650° F. (about 345° C.). The catalyst used in this step is typically an amorphous lube hydrocracking catalyst but it may also be based on the mesoporous crystalline materials described below for the second stage catalyst, preferably with a high base metals content since these catalysts have been found to be highly effective for processing lube range feeds including waxes. Typically, the conversion in the first stage is limited to no more than 40, preferably no more than 30, weight percent of the original feed.

In the second stage, the conditions are optimized for hydroisomerization of the paraffins originally present in the feed together with the paraffins produced by hydrocracking in the first stage. For this purpose a catalyst with high isomerization selectivity is employed, and for this purpose, a catalyst based on the crystalline mesoporous materials has been found to give I excellent results. A noble metal, preferably platinum, is used to provide hydrogenation-dehydrogenation functionality in this catalyst in order to promote the desired hydroisomerization reactions.

The mesoporous siliceous materials used for the second stage catalyst ndve d novel and unique pore geometry and, in a preferred form described below, are characterized by a substantially uniform hexagonal honeycomb microstructure with uniform pores having a cell diameter greater than 13 Å and typically in the range of 20 to 100 Å. Most prominent among these materials is a new crystalline material identified as MCM-41 which is usually synthesized as a metallosilicate with Bronsted acid sites by incorporating a tetrahedrally coordinated trivalent element such as Al, Ga, B, or Fe within the silicate framework. MCM-41 is characterized by a microstructure with a uniform, hexagonal arrangement of pores with diameters of at least about 13 Å, after calcination it exhibits an X-ray diffraction pattern with at least one d-spacing greater than about 18 Å and a hexagonal electron diffraction pattern that can be indexed with a $d_{100}$ value greater than about 18 Å which corresponds to at least one peak in the X-ray diffraction pattern. The preferred catalytic form is the aluminosilicate although the boroaluminosilicate may also be used to advantage to produce the desired low acidity forms of this catalyst used in the second stage of the present process.

The process may be operated with relatively high pressures in the first stage in order to maximize removal of aromatic components in the feed and for this purpose pressures of at least 800 psig (about 5,620 kPa), usually from about 1,000 to 3,000 psig (about 7,000 to 20,785 kPa abs.) are suitable. The second stage may be operated either by cascading the first stage effluent directly into the second stage without a pressure reduction or, alternatively, by passing the first stage products through an interstage separator to remove light ends and inorganic heteroatoms. The cascade process without interstage separation, represents a preferred mode of operation because of its simplicity.

BRIEF DESCRIPTION OF THE DRAWINGS

In the accompanying drawings.

DETAILED DESCRIPTION

Figure 1:
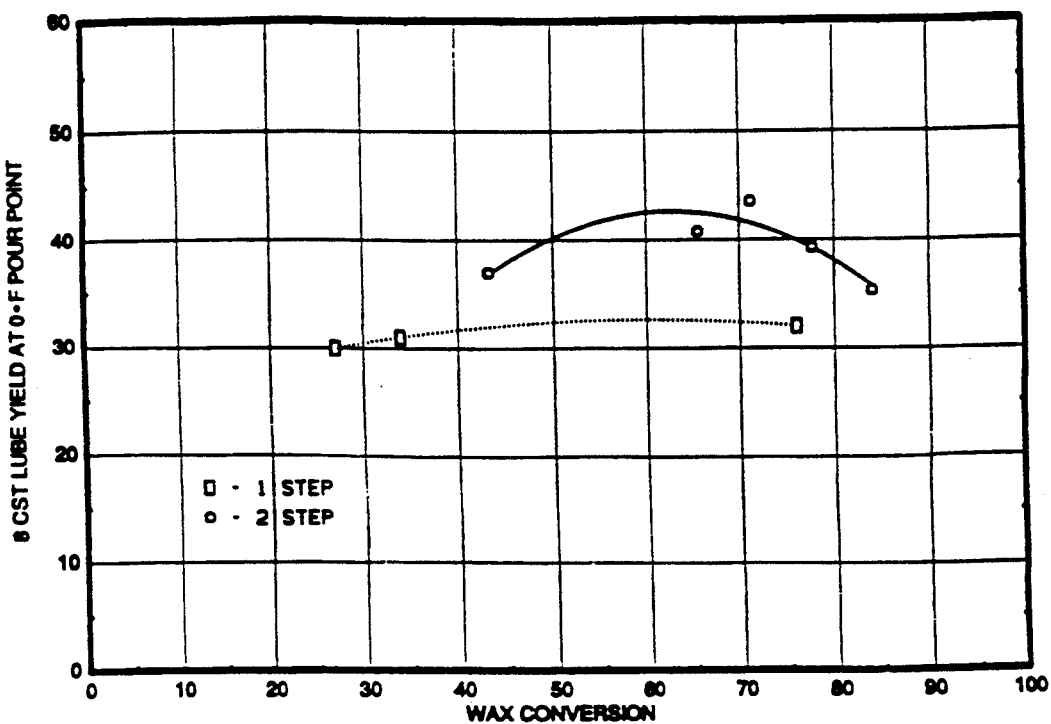
FIGS. 1 and 2 are graphs illustrating the results of wax hydroprocessing experiments reported in the Examples.

In the present process waxy feeds are converted to high V.I. lubricants in a two-stage hydrocracking-hydroisomerization process. The products are characterized by good viscometric properties including high viscosity index of at least 110, typically at least 140 and usually in the range 143 to 147 with feeds of low oil content. The two stages of the process are carried out in the presence of hydrogen using catalysts which are optimized for selective removal of the low quality aromatic components in the first stage by hydrocracking reactions and selective paraffin isomerization in the second stage to form low pour point, high V.I. products.

FEED

The feed to the process comprises a petroleum wax which contains at least 20 and preferably higher wax content, for example, at least 50 weight percent wax, as determined by ASTM test D-3235. In these feeds of mineral oil origin, the waxes are mostly paraffins of high pour point, comprising straight chain and slightly branched chain paraffins such as methylparaffins.

Petroleum waxes, that is, waxes of paraffinic character are derived from the refining of petroleum and other liquids by physical separation from a wax-containing refinery stream, usually by chilling the stream to a temperature at which the wax separates, usually by solvent dewaxing, e.g., MEK/toluene dewaxing or by means of an autorefrigerant process such as propane dewaxing. These waxes have high initial boiling points above about 650° F. (about 345° C.) which render them extremely useful for processing into lubricants which also require an initial boiling point of at least 650° F. (about 345° C.). The presence of lower boiling components is not to be excluded since they will be removed together with products of similar boiling range produced during the processing during the separation steps which follow the characteristic processing steps. Since these components will, however, load up the process units they are preferably excluded by suitable choice of feed cut point. The end point of wax feeds derived from the solvent dewaxing of neutral oils i.e. distillate fractions produced by the vacuum distillation of long or atmospheric resids will usually be not more than about 1100° F. (about 595° C.) so that they may normally be classified as distillate rather than residual streams but high boiling wax feeds such as petrolatum waxes i.e. the waxes separated from bright stock dewaxing, which may typically have an end point of up to about 1300° F. (about 705° F.), may also be employed, as may Fischer-Tropsch waxes.

The wax content of the feed is at least 20 weight percent and, for the highest VI products with reasonably good yield patterns, should be at least 50 weight percent, usually at least 60 to 80, weight percent with the balance from occluded oil comprising iso-paraffins, aromatics and naphthenics. The non-wax content of aromatics, polynaphthenes and highly branched naphthenes will normally not exceed about 40 weight percent of the wax and preferably will not exceed 25 to 30 weight percent. These waxy, highly paraffinic wax stocks usually have low viscosities because of their relatively low content of aromatics and naphthenes although the high content of waxy paraffins gives them melting points and pour points which render them unacceptable as lubricants without further processing.

As noted, the quality of the lube products will vary according to the wax content of the feed, with the higher VI products being obtained from the more waxy feeds. For feeds with wax contents below 50 weight percent, the typical product VI, under normal processing constraints, is approximately as shown below:

| Feed Wax Content | Product VI |
|---|---|
| 20 | 110 |
| 35 | 130 |
| 50 | 140 |

Thus, for lube products with a VI of at least 140, the feed should have a wax content of at least 50 weight percent, although lower quality products may be obtained with feeds of lower wax content.

The feeds will normally be slack waxes, that is, the waxy product obtained directly from a solvent dewaxing process, e.g. an MEK or propane dewaxing process, operating on a neutral (distillate) or a residual type feed, for example, bright stock (petrolatum slack wax). The slack wax, which is a solid to semi-solid product, comprising mostly highly waxy paraffins (mostly n- and monomethyl paraffins) together with occluded oil, may be fed directly to the first step of the present processing sequence as described below without the requirement for any initial preparation, for example, by hydrotreating.

The compositions (P/N/A) of some typical waxes are given in Table 1 below.

TABLE 1

| Wax Composition - Arab Light Crude | | | | |
|---|---|---|---|---|
| | A | B | C | D |
| Paraffins, wt. pct. | 94.2 | 81.8 | 70.5 | 51.4 |
| Mono-naphthenes, wt. pct. | 2.6 | 11.0 | 6.3 | 16.5 |
| Poly-naphthenes, wt. pct. | 2.2 | 3.2 | 7.9 | 9.9 |
| Aromatics, wt. pct. | 1.0 | 4.0 | 15.3 | 22.2 |

A typical slack wax feed has the composition shown in Table 2 below. This slack wax is obtained from the solvent (MEK) dewaxing of a 300 SUS (65 cST) neutral oil obtained from an Arab Light crude.

TABLE 2

| Slack Wax Properties | |
|---|---|
| API | 39 |
| Hydrogen, wt. pct. | 15.14 |
| Sulfur, wt. pct. | 0.18 |
| Nitrogen, ppmw | 11 |
| Melting point, °C. (°F.) | 57 (135) |
| KV at 100° C., cSt | 5.168 |
| PNA, wt pct: | |
| Paraffins | 70.3 |
| Naphthenes | 13.6 |
| Aromatics | 16.3 |

| Simulated Distillation: | | |
|---|---|---|
| % | °C. | (°F.) |
| 5 | 375 | (710) |
| 10 | 413 | (775) |
| 30 | 440 | (825) |
| 50 | 460 | (860) |
| 70 | 4B2 | (900) |
| 90 | 500 | (932) |
| 95 | 507 | (945) |

Another slack wax suitable for use in the present process has the properties set out in Table 3 below. This wax is prepared by the solvent dewaxing of a 450 SUS (100 cS) neutral raffinate:

TABLE 3

| Slack Wax Properties | |
|---|---|
| Boiling range, °F. (°C.) | 708–1053 (375–567) |
| API | 35.2 |
| Nitrogen, basic, ppmw | 23 |
| Nitrogen, total, ppmw | 28 |
| Sulfur, wt. pct. | 0.115 |
| Hydrogen, wt. pct. | 14.04 |
| Pour point, °F. (°C.) | 120 (50) |
| KV (100° C.) | 7.025 |
| KV (300° F., 150° C.) | 3.227 |
| Oil (D 3235) | 35 |
| Molecular wt. | 539 |
| P/N/A: | |
| Paraffins | — |
| Naphthenes | — |
| Aromatics | 10 |

FIRST STAGE
HYDROPROCESSING—HYDROCRACKING

The waxy feed is subjected to a two-step hydrocracking-hydroisomerization process in which both steps are carried out in the presence of hydrogen. In the first step, a bifunctional catalyst is used to promote the saturation and ring opening of the low quality aromatic components in the feed to produce hydrocracked products which are relatively more paraffinic. This stage is carried out under high pressure to favor aromatics saturation but the conversion is maintained at a relatively low level in order to minimize cracking of the paraffinic components of the feed and of the products obtained from the saturation and ring opening of the aromatic materials. Consistent with these process objectives, the hydrogen pressure in the first stage is at least 800 psig (about 5,620 kPa abs.) and usually is in the range of 1,000 to 3,000 psig (about 7,000 to 20,785 kPa abs). Normally, hydrogen partial pressures of at least 1,500 psig (about 1,435 kPa abs.) are best in order to obtain a high level of aromatic saturation with pressures in the range of 1,500 to 2,500 psig (about 1,435 to 17,340 kPa abs) being suitable for most high pressure equipment. Hydrogen circulation rates of at least about 1,000 SCF/Bbl (about 180 n.l.l$^{-1}$.), preferably in the reange of 5,000 to 10,000 SCF/Bbl (about 900 to 1,800 n.l.l$^{-1}$) are suitable.

In this stage of the process, the conversion of the feed to products boiling below the lube boiling range, typically to 650° F.- (about 345° C.-) products is limited to no more than 50 weight percent of the feed and will usually be not more than 40 weight percent of the feed in order to maintain the desired high single pass yields which are characteristic of the process while preparing the feed for the second stage of the processing; an initial VI for the first stage product of at least about 130 is normally desirable for the final product to have the desired VI of 140 or higher. The actual conversion is, for this reason, dependant on the quality of the feed with the oil content of the feed being a significant factor in the conversion: feeds of higher oil content should be hydrocracked under higher conversion conditions than those of lower oil content in order to remove the less desirable materials associated with the oil components of the feed. Thus, the feeds with the minimum wax contaent of about 20 weight percent should be run at a conversion of up to about 40 weight percent (to 650° F- products) while lower conversions are appropriate for the preferred feeds with at least 50 percent wax, for example, from 10 to 30 percent conversion. The composition of the wax feed is also significant: slack wax feeds from neutral (distillate) stocks will not require as high a conversion to achieve the target VI values since they contain lower levels of the low VI cyclic components; petrolatums, by contrast, will require higher conversion to remove more of the low quality polycyclic components present in these feeds. With slack wax feeds derived from the dewaxing of neutral stocks, the conversion (to non-lube, usually 650° F.-, products) will, for all practical purposes not be greater than 10 to 20 weight percent, with about 15 weight percent being typical for heavy neutral slack waxes. With petrolatum feeds, the first stage conversion will typically be in the range of 20 to 25 weight percent for high VI products. The conversion may be maintained at the desired value by control of the temperature in this stage which will normally be in the range 600° to 800° F. (about 315° to 430° C.) and more usually in the range of about 650° to 750° F. (about 345° to 400° C.). Space velocity variations may also be used to control severity although this will be less coninnon in practice in view of mechanical constraints on the system.

The exact temperature selected to achieve the desired conversion will depend on the characteristics of the feed and of the catalyst as well as upon the extent to which it is necessary to remove the low quality aromatic components from the feed. In general terms, higher severity conditions are required for processing the more aromatic feeds up to the usual maximum of about 30 percent aromatics, than with the more paraffinic feeds. Thus, the properties of the feed should be correlated with the activity of the selected catalyst in order to arrive at the required operating temperature for the first stage in order to achieve the desired product properties, with the objective at this stage being to remove the undesirable, low quality aromatic components by hydrocracking while minimizing conversion of the more desirable paraffinic components to products boiling below the lube boiling range. In order to achieve the desired severity in this stage, temperature may also be correlated with the space velocity although for practical reasons, the space velocity will normally be held at a fixed value in accordance with mechanical and other constraints such as minimizing pressure drop. Generally, the space velocity will be in the range of 0.25 to 2 LHSV, hr.$^{-1}$ and usually in the range of 0.5 to 1.5 LHSV.

The first stage is carried out with a bifunctional lube hydrocracking catalyst which may be based on either an amorphous or a crystalline support material, as described below. Catalysts of this type have a high selectivity for aromatics hydrocracking reactions in order to remove the low quality aromatic components from the feed. In general terms, these catalysts include a metal component for promoting the desired aromatics saturation reactions and usually a combination of base metals is used since the feeds may often have a relatively high level of sulfur or other contaminants. The preferred base metal combinations are with one metal from the iron group (Group VIIIA) in combination with a metal of Group VIA. Thus, the base metal such as nickel or cobalt is used in combination with molybdenum or tungsten. The preferred combination is nickel/tungsten since it has been found to be highly effective for promoting the desired aromatics hydrocracking reaction. Noble metals such as platinum or palladium may be used since they have good hydrogenation activity in the absence of sulfur but they will normally not be preferred. The amounts of the metals present on the catalyst are chosen to achieve good hydrogenation activity and it generally will range from 1 to 10 weight percent of the Group VIIIA metal and 10 to 30 weight percent of the Group VIA metal, based on the total weight of the catalyst. If a noble metal component such as platinum or palladium is used instead of a base metal such as nickel or cobalt, relatively lower amounts are in order in view of the higher hydrogenation activities of these noble metals, typically from about 0.5 to 5 weight percent being sufficient. The metals may be incorporated by any suitable method including impregnation onto the porous support after it is formed into particles of the desired size or by addition to a gel of the support materials prior to calcination. Addition to the gel is a technique which may be used for the preparation of the amorphous type catalysts when relatively high amounts of the metal components are to be added e.g. above 10 weight percent of the Group VIIIA metal and above 20 weight percent of the Group VIA metal, although subsequent processing steps including calcination may adversely affect the uniformity of the distribution of the metal.

The support for the metal component of the hydrocracking catalyst may be an amorphous material since these possess a pore size distribution which is satisfactory for dealing with the high molecular weight materials in lube range feeds including waxes. In these amorphous catalysts, the metal component is supported on a porous, amorphous metal oxide support and alumina is preferred for this purpose although silica-alumina may also be employed. Other metal oxide components may also be present in the support although their presence is less desirable. Consistent with the requirements of a lube hydrocracking catalyst, the support should have a pore size and distribution which is adequate to permit the relatively bulky components of the high boiling feeds to enter the interior pore structure of the catalyst where the desired hydrocracking reactions occur. To this extent, the catalyst will normally have a minimum pore size of about 50 Å i.e with no less than about 5 percent of the pores having a pore size less than 50 Å pore size, with the majority of the pores having a pore size in the range of 50–400 Å (no more than 5 percent having a pore size above 400 Å), preferably with no more than about 30 percent having pore sizes in the range of 200–400 Å. Preferred catalysts for the first stage have at least 60 percent of the pores in the 50–200 Å range. The pore size distribution and other properties of some typical lube hydrocracking catalysts suitable for use in the first stage are shown in Table 4 below:

TABLE 4

LHDC Catalyst Properties

| Form | 1.5 mm cyl. | 1.5 mm. tri. | 1.5 mm. cyl. |
|---|---|---|---|
| Pore Volume, cc/gm | 0.331 | 0.453 | 0.426 |
| Surface Area, m$^2$/gm | 131 | 170 | 116 |
| Nickel, wt. pct. | 4.8 | 4.6 | 5.6 |
| Tungsten, wt. pct. | 22.3 | 23.8 | 17.25 |
| Fluorine, wt. pct. | — | — | 3.35 |
| Silica, wt. pct. | — | — | 2 |
| Alumina, wt. pct. | — | — | 60.3 |
| Real Density, gm/cc | 4.229 | 4.238 | 4.023 |
| Particle Density, gm/cc | 1.744 | 1.451 | 1.483 |
| Packing Density, gm/cc | 1.2 | 0.85 | 0.94 |

If necessary in order to obtain the desired conversion, the catalyst may be promoted with fluorine, either by incorporating fluorine into the catalyst during its preparation or by operating the hydrocracking in the presence of a fluorine compound which is added to the feed. This will normally not be required with the processing of slack wax feeds but petrolatum feeds requiring higher levels of conversion, as discussed above, may necessitate the use of a halogenated catalyst as well as the use of higher temperatures during the hydrocracking. Fluorine compounds may be incorporated into the catalyst by impregnation during its preparation with a suitable fluorine compound such as ammonium fluoride (NH$_4$F) or ammonium bifluoride (NH$_4$F.HF) of which the latter is preferred. The amount of fluorine used in catalysts which contain this element is preferably from about 1 to 10 weight percent, based on the total weight of the catalyst, usually from about 2 to 6 weight percent. The fluorine may be incorporated by adding the fluorine compound to a gel of the metal oxide support during the preparation of the catalyst or by impregnation after the particles of the catalyst have been formed by drying or calcining the gel. If the catalyst contains a relatively high amount of fluorine as well as high amounts of the metals, as noted above, it is preferred to incorporate the metals and the fluorine compound into the metal oxide gel prior to drying and calcining the gel to form the finished catalyst particles.

The catalyst activity may also be maintained at the desired level by in situ fluoriding in which a fluorine compound is added to the stream which passes over the catalyst in this stage of the operation. The fluorine compound may be added continuously or intermittently to the feed or, alternatively, an initial activation step may be carried out in which the fluorine compound is passed over the catalyst in the absence of the feed e.g. in a stream of hydrogen in order to increase the fluorine content of the catalyst prior to initiation of the actual hydrocracking. In situ fluoriding of the catalyst in this way is preferably carried out to induce a fluorine content of about 1 to 10 percent fluorine prior to operation, after which the fluorine can be reduced to maintenance levels sufficient to maintain the desired activity. Suitable compounds for in situ fluoriding are ortho-fluorotoluene and difluoroethane.

Although the heteroatom content of the feed is low enough not to require removal of heteroatoms (so that it may be passed directly into the first process step, without the necessity of a preliminary hydrotreatment), the level of sulfur (usually greater than 30 ppm) and other contaminants is high enough to require that the metal component of the hydrocracking catalyst should be a base metal or base metal combination. The requirement, in this step of the process, of effecting a significant degree of saturation of aromatic components, requires, however, a high level of hydrogenation functionality and this, in turn, implies a high metal content when working with base metals. Although fairly high metal levels may be achieved with the amorphous catalysts, this usually is at the expense of catalytic surface area and usually necessitates the use of a promoter which, as mentioned above, is metallurgically and environmentally undesirable. For these reasons, the use of non-promoted crystalline catalysts is particularly useful in this step of the process. The crystalline catalysts which have been found to be highly effective for lube hydrocracking are those based on the mesoporous crystalline materials, especially the catalysts containing a high level of the base metal or base metal combinations as the hydrogenation component. Thus, as an alternative to the amorphous type, lube hydrocracking catalysts, the first stage catalyst may be based on a mesoporous support material as described below. The preferred crystalline hydrocracking catalysts of this type comprise a base metal combination of a Group VIIIA metal from the iron sub-group, preferably nickel, with a Group VIA metal, preferably tungsten, on the mesoporous support.

Co-pending Application Ser. No. 07/734,971, filed concurrently, discloses the use of the mesoporous crystalline materials in lube hydrocracking catalysts and shows that unpromoted catalysts based on these materials are highly effective for high boiling feeds. Co-pending Application Ser. No. 07/734,999, filed concurrently, discloses the use of the mesoporous crystalline materials in wax hydrocracking catalysts and shows that these catalysts are highly effective for treating wax feeds.

Reference is made to Ser. Nos. 07/734,971 and 07/734,999 for a description of mesoporous hydrocracking catalysts which may be used in the first step of the present process.

The advantage of the mesoporous crystalline materials in these catalysts is that the catalysts are capable of having high levels of metal while still retaining high surface areas: these catalysts are very effective for the processing of feeds such as those used in the present process where the objective is to achieve a high degree of saturation. Co-pending Application Ser. No. 07/734,987 describes high metal content catalysts based on the crystalline mesoporous support materials and reference is made to Ser. No. 07/734,987 for details of such catalysts and their preparation and use.

Typically, the lube hydrocracking catalysts using the mesoporous materials (as described below) as supports will have metal contents above 12.9 weight percent (based on the entire catalyst) for good hydrogenation activity while retaining surface areas of at least 200 m$^2 \cdot$g$^{-1}$. Higher metal loadings are possible, while still retaining sufficient catalytic surface area to enable the use of promoters to be dispensed with. Thus, for example, catalysts with metal loadings of about 25 percent and above still maintain a high surface area above 200 m$^2$ g$^{-1}$ and the total metal content (i.e of the metal component) may exceed about 30 weight percent, e.g. 30–40 weight percent, of the entire catalyst while still retaining a surface area of at least 200 m² g$^{-1}$, e.g. 240 m²g$^{-1}$ or even higher. At lower metal contents, the surface area will be correspondingly higher so that, for example, at a total metal content of about 20 weight percent of the entire catalyst, the surface area will be at least 400 m²g$^{-1}$ or higher, larger by a factor of about three or more compared to conventional amorphous catalysts with similar metal loadings. At about 12 to 15 percent total metal, e.g. 13 percent, the surface area will be at least 500 m²g$^{-1}$. Catalysts containing at least about 25 weight percent total metal with a retained surface area of at least 300 m²g$^{-1}$ constitute a highly useful class of hydrocracking catalysts.

Another advantage accruing from the use of the mesoporous supports is that in spite of the high metal loadings which may be accommodated, the density of the catalyst remains relatively low, compared to conventional catalysts. At a total metal content of about 12 to 15 weight percent, for example, e.g. at levels exceeding the normal minimum loading of 12.9 percent, the real density of the catalyst is about 2.8 g.cc$^{-1}$, as compared to conventional catalysts which have real densities of at least about 4 at these loadings. At higher loadings, a similar advantage prevails: the present catalysts are only about il three-fourths as dense as conventional catalysts at comparable metal loadings. For example, at metal loadings of about 20 to 25 weight percent of the entire catalyst, the real density will be in the range of 3.000 to 3.300 g.cc$^{-1}$, as compared to about 4.00 to 4.2 for conventional catalysts. At metal loadings above about 30 weight percent, the real density will be in the range of about II 4.1 to 4.3 g.cc$^{-1}$. Particle densities range from about 0.88 at about 12 to 15 weight percent metal to about 1.0 at about 20 to 25 weight percent metal and about 1.1 at 30 to 40 weight percent metal. Real densities are determined by measuring the volume of mercury displaced by a given weight of catalyst.

The pore volumes of the catalysts based on the mesoporous supports are commensurately high: a pore volume of at least 0.55 cc.g$^{-1}$ and usually higher, typically at least about 0.6 cc.g$^{-1}$ at metal loadings as high as 20 weight percent is typical. Pore volumes are determined by subtracting the inverse of the real density from the inverse of the particle density.

The hydrogenation component can be exchanged onto the mesoporous support material, impregnated into it or physically admixed with it, or any combination of these methods. If the metal is to be impregnated into or exchanged onto the mesoporous support, it may be done, for example, by treating the calcined material with a metal-containing cation. A preferred exchange technique involves competitive exchange in the presence of ammonium cations (which are converted into hydrogen on subsequent calcination); it is thought that this technique may disperse the metal cations more evenly throughout the pore structure of the support material. Metals which form stable anions are suitable for incorporation by impregnation; typical anionic complexes such as the molybdate, vanadate and metatungstate ions may be used to incorporate molybdenum, vanadium and tungsten. Other metals may be incorporated using suitable anionic complexes in the same way. Cationic forms of metals exchanged onto the crystalline material or impregnated into it. A particular advantage of the present catalysts is that the high loadings of two or more metals may be incorporated by a single impregnation onto the calcined material using the incipient wetness technique rather than successive impregnations with the different metals; this produces a more uniform distribution of the two or more metals in the catalyst. It is an additional advantage that the high metals levels, above about 25 weight percent total metal may be incorporated by impregnation into the calcined material as distinct from the conventional techniques requiring incorporation of a II solution of the metal components(s) into a hydrogel prior to calcination. The fact that the present catalysts have good bifunctional activity without the necessity for halogen promoter also enables the halogen promoter to be dispensed with.

The metals present on the hydrocracking catalyst are preferably used in their sulfide form and to this purpose presulfiding of the catalyst should be carried out prior to initiation of the hydrocracking. Sulfiding is an established technique and it is typically carried out by contacting the catalyst with a sulfur-containing gas, usually in the presence of hydrogen. The mixture of hydrogen and hydrogen sulfide, carbon disulfide or a mercaptan such as butol mercaptan is conventional for this purpose. Presulfiding may also be carried out by contacting the catalyst with hydrogen and a sulfur-containing hydrocarbon oil such as a sour kerosene or gas oil.

HYDROISOMERIZATION

During the first stage of the process, the low quality, relatively aromatic components of the feed are converted by hydrocracking to products which are relatively more paraffinic in character by saturation and ring opening. The paraffinic materials present in the stream at this stage of the process possess good VI characteristics but have relatively high pour points as a result of their paraffinic nature. The objective in the second stage of the process is to effect a selective hydroisomerization of these paraffinic components to isoparaffins which, while possessing good viscometric properties, also have lower pour points. This enables the pour point of the final product to be obtained without an excessive degree of dewaxing following the hydroisomerization. for this stage of the process, hydrogen pressures typically over 1,000 psig (about 7,000 kPa) are preferred with the second stage operated in cascade with the first stage, at an inlet pressure equal to the outlet pressure of the first stage. Pressures are normally in the range of 1,000 to 3,000 psig, usually 1,500-2,500 psig (1,435 to 17,340 kPa) with hydrogen circulation rates are comparable to those used in the first stage.

The catalyst used in the second stage is one which has a high selectivity for the isomerization of waxy, linear or near linear paraffins to less waxy, isoparaffinic products. The catalysts are bifunctional in character, comprising a metal hydrogenation-dehydrogenation component on a mesoporous support which provides the desired acidic functionality for the desired isomerization reactions while minimizing conversion to products boiling outside the lube boiling range during this stage of the operation.

The metal component of the second stage catalyst is included in order to promote the desired hydroisomerization reactions which, proceeding through unsaturated transitional species, require mediation by a hydrogenation-dehydrogenation component. In order to maximize the isomerization activity of the catalyst, metals having a strong hydrogenation function are preferred and for this reason, platinum and the other noble metals such as palladium are given a preference. The amount of the noble metal hydrogenation component is typically in the range 0.5 to 5 weight percent of the total catalyst, usually from 0.5 to 2 weight percent. The content of the metal component will vary according to its catalytic activity. Thus, the highly active noble metals may be used in smaller amounts than the less active base metals. For example, about 1 wt. percent or less platinum will be effective and in a preferred base metal combination, about 7 wt. percent nickel and about 2.1 to about 21 wt. percent tungsten, expressed as metal. Since the content of the metal is smaller in this stage using the noble metal component, the determination of the X-ray pattern of the support material will present no problem but it has been found that the presence of high metal loadings may obscure the X-ray pattern and for this reason the X-ray pattern should be detrmined on the metal-free support.

The hydrogenation component can be exchanged onto the support material, impregnated into it or physically admixed with it, as described above. If the metal is to be impregnated into or exchanged onto the mesoporous support, it may be done, for example, by treating the zeolite with a platinum metal-containing ion. Suitable platinum compounds include chloroplatinic acid, platinous chloride and various compounds containing the platinum ammine complex. The metal compounds may be either compounds in which the metal is present in the cation of the compound and compounds in which it is present in the anion of the compound. Both types of compounds can be used. Platinum compounds in which the metal is in the form of a cation of cationic complex, e.g., $PT(NH_3)_4Cl_2$ are particularly useful, as are anionic complexes such as the vanadate and metatungstate ions. Cationic forms of other metals are also very useful since they may be exchanged onto the zeolite or impregnated into it.

The catalyst may be subjected to a final calcination under conventional conditions in order to convert the metal to the oxide form and to confer the required mechanical strength on the catalyst. Prior to use the catalyst may be subjected to presulfiding as described above for the first stage catalyst.

MESOPOROUS CRYSTALLINE COMPONENT

The support material used for the second stage catalyst is a mesoporous crystalline material which is described in detail below. When it is used in I the present catalysts, the mesoporus crystalline material is at least partly in the decationized or hydrogen form in order to provide the desired low degree of acidic functionality for the reactions which are to take place in this stage of the operation.

The catalytic material used in the present invention includes a novel synthetic composition of matter comprising an ultra-large pore size crystalline phase. This material is an inorganic, porous, non-layered crystalline phase material which can be characterized (in its calcined form) by an X-ray diffraction pattern with at least one peak having a realtive intensity of 100 at a d-spacing greater than about 18 Å and a benzene sorption capacity of greater than 15 grams of benzene per 100 grams of the the material at 50 torr and 25° C.

The preferred form of the crystalline material is an inorganic, porous, non-layered material having a hexagonal arrangement of uniformly-sized pores with a maximum perpendicular cross-section pore dimension of at least about 13 Å (Å), and typically within the range of from about 13 Å to about 200 Å. A preferred form of this hexagonal crystalline composition, identified as having the structure of MCM-41, has a structure with a hexagonal arrangement of uniformly-sized pores of at least 13 Å diameter. This material exhibits a hexagonal electron diffraction pattern that can be indexed with a $d_{100}$ value greater than about 18 Å which corresponds to at least one peak in the X-ray diffraction pattern. This material and its preparation and properties are described in further detail in Application 07/625,425 (Kresge et al.) as well as below.

The inorganic, non-layered mesoporous crystalline material used as the support component of the hydroisomerization catalyst has the following composition:

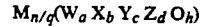

$$M_{n/q}(W_a X_b Y_c Z_d O_h)$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and $(a+b+c+d)=1$.

A preferred embodiment of the above crystalline material is when $(a+b+c)$ is greater than d, and $h=2$. A further embodiment is when a and $d=0$, and $h=2$. The preferred materials for use in making the present catalysts are the aluminosilicates although the other metallosilicates such as the boroaluminsilicates may also be used to obtain the desired low acidities.

In the as-synthesized form, the support material has a composition, on an anhydrous basis, expressed empirically as follows:

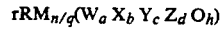

$$rRM_{n/q}(W_a X_b Y_c Z_d O_h)$$

where R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods described below.

To the extent desired, the original M, e.g. sodium or chloride, ions of the as-synthesized material of this invention can be replaced in accordance with conventional ion-exchange techniques. Preferred replacing ions include metal ions, hydrogen ions, hydrogen precursor, e.g. amonium, ions and mixtures of these ions. Particularly preferred ions are those which provide the desired metal functionality in the final catalyst. These include hydrogen, rare earth metals and metals of Groups VIIA (e.g. Mn), VIIIA (e.g. NI),IB (e.g. Cu), IVB (e.g. Sn) of the Periodic Table of the Elements and mixtures of these ions.

The crystalline (i.e. having sufficient order to provide a diffraction pattern such as, for example, by X-ray, electron or neutron diffraction, following calcination with at least one peak) mesoporous material may be characterized by its structure, which includes extremely large pore windows as well as by its high sorption capacity. The term "mesoporous" is used here to indicate crystals having uniform pores within the range of from about 13 Å to about 200 Å. The mesoporous materials have uniform pores within the range of from about 13 Å to about 200 Å, more usually from about 15 Å to about 100 Å. Since these pores are significantly larger than those of other crystalline materials, it is appropriate to refer to them as ultra-large pore size materials. For the purposes of this application, a working definition of "porous" is a material that adsorbs at least 1 gram of a small molecule, such as Ar, $N_2$, n-hexane or cyclohexane, per 100 grams of the solid. The large pores in the present catalytic materials enable them to accommodate molecules with bulky molecular configurations and long chain structures. The catalysts are therefore particularly useful for processing high boiling feeds such as those obtained from high boiling slack waxes, for example, heavy neutral slack wax or petrolatum slack wax.

The catalytic material can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The preferred materials have a hexagonal arrangement of large open channels that can be synthesized with open internal diameters from about 13 Å to about 200 Å. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

The most regular preparations of the material of the present invention give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0\sqrt{3}/1$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hkO subset of unique reflections of 100, 110, 200, 210, etc., and their syninetry-related reflections.

In its calcined form, the crystalline material may be further characterized by an X-ray diffraction pattern with at least one peak at a position greater than about 18 Angstrom Units d-spacing (4.909° $2\theta$ for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incluenxal contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal. More particularly, the calcined crystalline non-layered material may be characterized by an X-ray diffraction pattern with at least two peaks at positions greater than about 10 Å d-spacing (8.842°$\theta$ for Cu K-alpha radiation), at least one of which is at a position greater than about 18 Angstrom Units d-spacing, and no peaks at positions less than about 10 Å d-spacing with relative intensity greater than about 20% of the strongest peak. Still more particularly, the X-ray diffraction pattern of the calcined material of this invention will have no peaks at positions less than about 10 Å d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined inorganic, non-layered crystalline material may also be characterized as having a pore size of about 13 Å or greater as measured by physisorption measurements, described below. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of $2\theta$, where $\theta$ is the Bragg angle, and a counting time of 10 seconds for each step. The interplanar spacings, d's, were calculated in Å (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75-100), s=strong (50-74), m=medium (25-49) and w=weak (0-24). The diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described below.

The ammonium form of the catalytic material may be readily converted to the hydrogen form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, described below. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, described below, and a solvent or solvent mixture, such as, for example, $C_1$-$C_6$ alcohols, $C_1$-$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | where e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the desired crystalline material.

A second method for synthesis of the crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, described below. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each described below, and a solvent or solvent mixture, such as, for example, $C_1$-$C_6$ alcohols, $C_1$-$C_6$ diols and/or water, especially water. The reaction mixture has a composition, in terms of mole ratios of ioxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/$ | 0.1 to 2.0 | 0.12 to 1.0 |

-continued

| Reactants | Useful | Preferred |
|---|---|---|
| $(YO_2 + WO + Z_2O_5 + X_2O_3)$ | 0.1 to 2.0 | 0.12 to 1.0 | where e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the precise value of the pH is not important for crystallization.

A third method for synthesis of the crystalline material is where X comprises aluminum and Y comprises silicon, the crystallization temperature must be from about 25° C. to about 175° C., preferably from about 50° C. to about 150° C., and an organic directing agent, described below, or, preferably a combination of that organic directing agent plus an additional organic agent, described below, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | where e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to about 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to about 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. The crystals are then separated from the liquid and recovered. Following the synthesis, the crystalline material should be subjected to treatment to remove part or all of any organic constituent.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, various embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods include:

| W | X | Y | Z |
|---|---|---|---|
| — | Al | Si | — |
| — | Al | — | P |
| — | Al | Si | P |
| Co | Al | — | P |
| Co | Al | Si | P |

| W | X | Y | Z |
|---|---|---|---|
| — | — | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

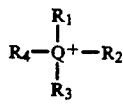

where Q is nitrogen or phosphorus and wherein at least one of $R_1$, $R_2$, $R_3$ and $R_4$ is aryl or alkyl of from 6 to about 36 carbon atoms, e.g. $-C_6H_{13}$, $-C_{10}H_{21}$, $-C_{16}H_{33}$ and $-C_{18}H_{37}$, or combinations thereof, the remainder of $R_1$, $R_2$, $R_3$ and $R_4$ being selected from hydrogen, alkyl of from 1 to 5 carbon atoms and combinations of these. The compound from which the above ammonium or phosphonium ion is derived may be, for example, the hydroxide, halide, silicate, or mixtures of these.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, benzyltrimethylammonium, cetylpyridinium, myristyltrimethylammonium, decyltrimethylammonium, dodecyltrimethylammonium and dimethyldidodecylammonium.

The reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the synthesis procedure can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The size of the pores in the present mesoporous catalytic materials is largi enough that the spatiospecific selectivity with respect to transition state species in reactions such as cracking is minimized (Chen et al., "Shape Selective Catalysis in Industrial Applications", 36 CHEMICAL INDUSTRIES, pgs. 41–61 (1989) to which reference is made for a discussion of the factors affecting shape selectivity). Diffusional limitations are also minimized as a result of the very large pores.

The crystals of the mesoporous support material will be composited with a matrix material to form the finished catalyst and for this purpose conventional non-acidic matrix materials such as alumina, silica-alumina and silica are suitable with preference given to silica as a non-acidic binder, although non-acidic aluminas such as alpha boehmite (alpha alumina monohydrate) may also be used, provided that they do not confer any substantial degree of acidic activity on the matrixed catalyst. The use of silica as a binder is preferred since alumina, even if non-acidic in character, may tend to react with the zeolite under hydrothermal reaction conditions to enhance its acidity. The mesoporous material is usually composited with the matrix in amounts from 80:20 to 20:80 by weight, typically from 80:20 to 50:50 mesoporous material:matrix. Compositing may be done by conventional means including mulling the materials together followed by extrusion of pelletizing into the desired finished catalyst particles. A preferred method for extrusion with silica as a binder is disclosed in U.S. Pat. No. 4,582,815. If the catalyst is to be steamed in order to achieve the desired low acidity, it is performed after the catalyst has been formulated with the binder, as is conventional.

The catalyst may be treated by conventional presulfiding treatments, e.g. by heating in the presence of hydrogen sulfide, to convert oxide forms of the metal components to their corresponding sulfides.

HYDROISOMERIZATION CONDITIONS

The objective in the second stage is to isomerize the waxy, linear and near-linear paraffinic components in the first stage effluent to less waxy but high VI isoparaffinic materials of relatively lower pour point. The conditions in the second stage are therefore adjusted to achieve this end while minimizing conversion to non-lube boiling range products (usually 650° F.-(345° C.-) materials). Since the catalyst used in this stage has a low acidity, conversion to lower boiling products is usually at a relatively low level and by appropriate selection of severity, second stage operation may be optimized for isomerization over cracking. At conventional space velocities of about 1, using a platinum-containing catalyst, temperatures in the second stage will typically be in the range of about 550° to about 700° F. (about 290° to 370° C.) with 650° F.+ conversion typically being from about 10 to 30 weight percent, more usually 12 to 20 weight percent, of the second stage feed. However, temperatures may be used outside this range, for example, as low as about 500° F. (260° C.) up to about 750° F. (about 400° C.) although the higher temperatures will usually not be preferred since they will be associated with a lower isomerization selectivity and the production of less stable lube products as a result of the hydrogenation reactions being thermodynamically less favored at progressively higher operating temperatures. With the increased activity resulting from the use of high hydrogen pressures temperatures in the second stage from about 550° to 700° F. (about 290° to 370° C.) will be preferred. Space velocities will typically be in the range of 0.5 to 2 LHSV (hr.$^{-1}$) although in most cases a space velocity of about 1 LHSV will be most favorable. Hydrogen circulation rates are comparable to those used in the first step, as described above but since there is no significant hydrogen consumption as a result of near hydrogen balance in this second step of the process, lower circulation rates may be employed if feasible. In the cascade operational mode, the excess hydrogen from the first stage will be found adequate for the second stage operation.

A particular advantage of the present process is that it enables a functional separation to be effected in the entire operating scheme. In the first stage, the undesirable low VI components are removed by a process of saturation and ring opening under conditions of high pressure and relatively high temperature. By contrast, the second stage is intended to maximize the content of iso-paraffins in the product and because the low VI materials have been dealt with in the first stage, can be optimized to effect a selective isomerization of the paraffinic materials. The low temperature conditions which are appropriate for the paraffin isomerization limit the cracking reactions as noted above but are thermodynamically favorable for the ii saturation of any lube range olefins which may be formed by cracking reactions, particularly in the presence of the highly active hydrogenation components on the catalyst. In this way, the second stage is also effective for hydrofinishing the product so that product stability is improved, especially stability to ultraviolet radiation, a property which is frequently lacking in conventional hydrocracked lube products. The isomerized product may therefore be subjected simply to a final dewaxing step in order to achieve the desired target pour point and usually there will be no need for any further finishing steps since a low unsaturates content, both of aromatics and of lube range olefins, results from the optimized processing in the two functionally separated steps of the process. The product may therefore be subjected to a final fractionation to remove lower boiling materials, followed by a final dewaxing step in order to achieve target pour point for the product.

DEWAXING

Although a final dewaxing step will normally be necessary in order to achieve the desired product pour point, it is a notable feature of the present process that the extent of dewaxing required is relatively small. Typically, the loss during the final dewaxing step will be no more than 15 to 20 weight percent of the dewaxer feed and may be lower. Either catalytic dewaxing or solvent dewaxing may be used at this point and if a solvent dewaxer is used, the removed wax may be recycled to the first or second stages of the process for further treatment. Since the wax removed in a solvent dewaxer is highly paraffinic, it may be recycled directly to the second stage if this is feasible, for example, in the embodiment where the second stage is operated at a relatively low pressure.

The preferred catalytic dewaxing processes utilize an intermediate pore size zeolite such as ZSM-5, but the most preferred dewaxing catalysts are based on the highly constrained intermediate pore size zeolites such as ZSM-22, ZSM-23 or ZSM-35, since these zeolites have been found to provide highly selective dewaxing, giving dewaxed products of low pour point and high VI. Dewaxing processes using these zeolites are described in U.S. Pat. Nos. 4,222,855. The zeolites whose use is preferred here may be characterized in the same way as described in U.S. Pat. No. 4,222,855, i.e. as zeolites having pore openings which result in the the possession of defined sorption properties set out in the patent, namely, (1) a ratio of sorption of n-hexane to o-xylene, on a volume percent basis, of greater than about 3, which sorption is determined at a $P/P_o$ of 0.1 and at a temperature of 50° C. for n-hexane and 80° C. for o-xylene and (2) by the ability of selectively cracking 3-methylpentane (3MP) in preference to the doubly branched 2,3-dimethylbutane (DMB) at 1000° F. and 1 atmosphere pressure from a 1/1/1 weight ratio mixture of n-hexane/3-methyl-pentane/ 2,3-dimethylbutane, with the ratio of rate constants $k_{3MP}/k_{DMB}$ determined at a temperature of 1000° F. being in excess of about 2. The expression, "$P/P_o$", is accorded its usual significance as described in the literature, for example, in "The Dynamical Character of Adsorption" by J. H. deboer, 2nd Edition, Oxford University Press (1968) and is the relative pressure defined as the ratio of the partial pressure of sorbate to the vapor pressure of sorbate at the temperature of sorption. The ratio of the rate constants, $k_{3MP}/k_{DMB}$, is determined from 1st order kinetics, in the usual manner, by the following equation:

$$k = (1/T_c) \ln (1/1-\epsilon)$$

where k is the rate constant for each component, $T_c$ is the contact time and $\epsilon$ is the fractional conversion of each component.

Zeolites conforming to these sorption requirements include the naturally occurring zeolite ferrierite as well as the known synthetic zeolites ZSM-22, ZSM-23 and ZSM-35. These zeolites are at least partly in the acid or hydrogen form when they are used in the dewaxing process and a metal hydrogenation component, preferably a noble metal such as platinum is preferable used. Excellent results have been obtained with a Pt/ZSM-23 dewaxing catalyst.

The preparation and properties of zeolites ZSM-22, ZSM-23 and ZSM-35 are described respectively in U.S. Pat. Nos. 4,810,357 (ZSM-22); 4,076,842 and 4,104,151 (ZSM-23) and 4,016,245 (ZSM-35), to which reference is made for a description of this zeolite and its preparation. Ferrierite is a naturally-occurring mineral, described in the literature, see, e.g., D. W. Breck, ZEOLITE MOLECULAR SIEVES, John Wiley and Sons (1974), pages 125-127, 146, 219 and 625, to which reference is made for a description of this zeolite.

In any event, however, the demands on the dewaxing unit for the product are relatively low and in this respect the present process provides a significant improvement over the process employing solely amorphous catalysts where a significant degree of dewaxing is required. The functional separation inherent in the process enable higher single pass wax conversions to be achieved, typically about 70 to 80% as compared to 50% for the amorphous catalyst process so that unit throughput is significantly enhanced with respect to the conventional process. Although conversions levels above 80 percent may be employed so that the load on the dewaxer is reduced, the product VI and yield decrease at the same time and generally, the final dewaxing stage cannot be completely eliminated unless products with a VI below about 135 are accepted.

PRODUCTS

The products from the process are high VI, low pour point materials which are obtained in excellent yield. Besides having excellent viscometric properties they are also highly stable, both oxidatively and thermally and to ultraviolet light. VI values in the range of 140 to 155 are typically obtained with high wax feeds, with values of 143 to 147 being readily achievable with product yields of at least 50 weight percent, usually at least 60 weight percent, on wax feed, corresponding to wax conversion values of almost 80 and 90 percent, respectively. Another notable feature of the process is that the products retain desirable viscosity values as a result of the limited boiling range conversions which are inherent in the process: conversely, higher yields are obtained at constant product viscosity.

Examples 1 to 19 below illustrate the preparation of the mesoporous crystalline materials used to prepare the catalysts. In these examples, the sorption data for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/ and more particularly greater than about 20 g/100 g.

A preferred way to do this is to contact the desired pure adsorbate vapor in an adsorption chamber evacuated to less than 1 Mm at conditions of 12 Torr of water vapor, 40 Torr of n-hexane or cyclohexane vapor, or 50 Torr of benzene vapor, at 25° C. The pressure is kept constant (within about ±0.5 Mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 dupont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the examples, percentages are by weight unless otherwise indicated.

EXAMPLE 1

One hundred grams of cetyltrimethylammonium (CTMA) hydroxide solution, prepared by contacting a 29 wt. % N,N,N- trimethyl-1-hexadecanaminium chloride solution with a hydroxide-forehalide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was placed in a steam box at 95° C. overnight. The mixture had a composition in terms of moles per mole $Al_2O_3$:

2.7 moles $Na_2O$
392 moles $SiO_2$
35.7 moles $(CTMA)_2O$
61.7 moles $(TMA)_2O$
6,231 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 475 $m^2/g$ and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The product of this example may be characterized by X-ray diffraction as including a very strong relative intensity line at 37.8±2.0 Å d-spacing, and weak lines at 21.6±1.0 and 19.2±1.0 Å. Transmission electron microscopy (TEM) produced images of a hexagonal arrangement of uniform pores and hexagonal electron diffraction pattern with a $d_{100}$ value of about 39 Å.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:

2.7 moles $Na_2O$
291 moles $SiO_2$
35.7 moles $(CTMA)_2O$
102 moles $(TMA)_2O$
6,120 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 993 $m^2/g$ and the following equilibrium adsorption capacities in grams/100 grams:

| | |
|---|---|
| H₂O | 7.1 |
| Cyclohexane | 47.2 |
| n-Hexane | 36.2 |
| Benzene | 49.5 |

The X-ray diffraction pattern of the calcined product may be characterized as including a very strong relative intensity line at 39.3±2.0 Å d-spacing, and weak lines at 22.2±1.0 and 19.4±1.0 Å. TEM indicated that the product contained the ultra-large pore material.

A portion of the above product was then contacted with 100% steam at 1450° F. for two hours. The surface area of the steamed material was measured to be 440 m²/g, indicating that about 45% was retained following severe steaming.

Another portion of the calcined product of this example was contacted with 100% steam at 1250° F. for two hours. The surface area of this material was measured to be 718 m²/g, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole Al₂O₃:

0.65 moles Na₂O
65 moles SiO₂
8.8 moles (CTMA)₂O
1.22 moles (TPA)₂O
336 moles H₂O The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole Al₂O₃:

0.65 moles Na₂O
65 moles SiO₂
15 moles (CTMA)₂O
1.22 moles (TPA)₂O
35.6 moles (TMA)₂O
2,927 moles H₂O The resulting solid product was recovered by filtration and dried in air at ambient temperature. The product was then calcined at 540° C. for 1 hour in nitrogen, followed by 6 hours in air.

The calcined product proved to have a surface area of 1,085 m²/g and the following equilibrium adsorption capacities in grams/100 grams:

| | |
|---|---|
| H₂O | 11.5 |
| Cyclohexane | >50 |
| n-Hexane | 39.8 |
| Benzene | 62 |

The X-ray diffraction pattern of the calcined product of this example may be characterized as including a very strong relative intensity line at 38.2±2.0 Å d-spacing, and weak lines at 22.2±1.0 and 19.4±1.0 Å. TEM indicated the product contained the ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole Al₂O₃:

0.23 moles Na₂O
33.2 moles SiO₂
6.1 moles (CTMA)₂O
5.2 moles (TMA)₂O
780 moles H₂O The resulting solid product was recovered by filtration and dried in air at ambient temperature. The product was then calcined at 540° C. for 1 hour in nitrogen, followed by 6 hours in air.

The calcined product proved to have a surface area of 1,043 m²/g and the following equilibrium adsorption capacities in grams/100 grams:

| | |
|---|---|
| H₂O | 6.3 |
| Cyclohexane | >50 |
| n-Hexane | 49.1 |
| Benzene | 66.7 |

The X-ray diffraction pattern of the calcined product may be characterized as including a very strong relative intensity line at 40.8±2.0 Å d-spacing, and weak lines at 23.1±1.0 and 20.1±1.0 Å. TEM indicated that the product contained the ultra-large pore material.

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole Al₂O₃:

1.0 moles P₂O₅
0.51 moles (Pyr)₂O
47.2 moles H₂O

The resulting solid product was recovered by filtration and dried in air at ambient temperature. The product was then calcined at 540° C. for 1 hour in nitrogen, followed by 6 hours in air.

The calcined product proved to have a surface area of 707 m²/g and the following equilibrium adsorption capacities in grams/100 grams:

| | |
|---|---|
| H₂O | 33.2 |
| Cyclohexane | 19.7 |
| n-Hexane | 20.1 |
| Benzene | 23.3 |

The X-ray diffraction pattern of the calcined product may be characterized as including a very strong relative intensity line at 25.4±1.5 Å d-spacing. TEM indicated the product contained the present ultra-large pore material.

EXAMPLE 6

A solution of 1.35 grams of NaAlO₂ (43.5% Al₂O₃, 30% Na₂O) dissolved in 45.2 grams of water was mixed with 17.3 grams of NAOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

0.25 moles Al₂O₃
10 moles Na₂O
36 moles SiO₂
0.95 moles (CTMA)₂O
2.5 moles (TEA)₂O
445 moles H₂O The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % SiO₂ and 5.1 wt. % Al₂O₃, and proved to have a benzene equilibrium adsorption capacity of 58.6 grams/100 grams.

The X-ray diffraction pattern of the calcined product may be characterized as including a very strong relative intensity line at 31.4±1.5 Å d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole SiO₂:

0.5 mole (CTMA)₂O
46.5 moles H₂O

The resulting solid product was recovered by filtration, washed with water, then calcined at 540° C. for 1 hour in nitrogen, followed by 10 hours in air.

The calcined product composition included less than 0.01 wt. % Na, about 98.7 wt. % SiO₂ and about 0.01 wt. % Al₂O₃, and proved to have a surface area of 896 m²/g. The calcined product had the following equilibrium adsorption capacities in grams/100 grams:

| | |
|---|---|
| H₂O | 8.4 |
| Cyclohexane | 49.8 |
| n-Hexane | 42.3 |
| Benzene | 55.7 |

The X-ray diffraction pattern of the calcined product of this example may be characterized as including a very strong relative intensity line at 40.0±2.0 Å d-spacing and a weak line at 21.2±1.0 Å. TEM indicated that the product of this example contained at least three separate phases, one of which was the ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole SiO₂:

0.5 mole (CTMA)₂O
46.5 moles H₂O

The resulting solid product was recovered by filtration, washed with water, then calcined at 540° C. for 6 hours in air.

The calcined product composition was measured to include 0.01 wt. % Na, 93.2 wt. % SiO₂ and 0.016 wt. % Al₂O₃, and proved to have a surface area of 992 m²/g and the following equilibrium adsorption capacities in grams/100 grams:

| | |
|---|---|
| H₂O | 4.6 |
| Cyclohexane | >50 |
| n-Hexane | >50 |
| Benzene | 62.7 |

The X-ray diffraction pattern of the calcined product may be characterized as including a very strong relative intensity line at 43.6±2.0 Å d-spacing and weak lines at 25.1±1.5 and 21.7±1.0 Å. TEM indicated that the product contained the ultra-large pore material.

EXAMPLE 9

Sodium aluminate (4.15 g) was added slowly into a solution containing 16 g of myristyltrimethylammonium bromide (C₁₄TMABR) in 100 g of water. Tetramethylammonium silicate (100 g-10% SiO₂) HiSil (25 g) and tetramethylammonium hydroxide (14.2 g-25% solution) were then added to the mixture. The mixture was crystallized in an autoclave at 120° C. with stirring for 24 hours.

The product was filtered, washed and air dried. Elemental analysis showed the product contained 53.3 wt % SiO₂, 3.2 wt % Al₂O₃, 15.0 wt % C, 1.88 wt % N, 0.11 wt % Na and 53.5 wt % ash at 1000° C. The X-ray diffraction pattern of the material after calcination at 540° C. for 1 hour in N₂ and 6 hours in air includes a very strong relative intensity line at 35.3±2.0 Å d-spacing and weak lines at 20.4±1.0 and 17.7±1.0 Å d-spacing. TEM indicated that the product contained the ultra-large pore material.

The washed product, having been exchanged with 1N ammonium nitrate solution at room temperature, then calcined, proved to have a surface area of 827 m²/g and the following equilibrium adsorption capacities in g/100 g anhydrous sorbent:

| | |
|---|---|
| H₂O | 30.8 |
| Cyclohexane | 33.0 |
| n-Hexane | 27.9 |
| Benzene | 40.7 |

EXAMPLE 10

Sodium aluminate (8.3 g) was added slowly into a solution containing 184 g of dodecyltrimethylammonium hydroxide ($C_{12}$TMAOH, 50%) solution diluted with 480 g of water. UltraSil (50 g) and an aqueous solution of tetramethylaninonium silicate (200 g-10% $SiO_2$) and tetramethylammonium hydroxide (26.38 g-25% solution) were then added to the mixture. The mixture was crystallized in an autoclave at 100° C. with stirring for 24 hours.

The product was filtered, washed and air dried. After calcination at 540° C. for 1 hour in $N_2$ and 6 hours in air, the X-ray diffraction pattern includes a very strong relative intensity line at 30.4±1.5 Å d-spacing and weak lines at 17.7±1.0 and 15.3±1.0 Å d-spacing. TEM indicated that the product contained the ultra-large pore material.

The washed product, having been exchanged with 1N ammonium nitrate solution at room temperature, then calcined, proved to have a surface area of 1,078 m²/g and the following equilibrium adsorption capacities in g/100 g anhydrous sorbent:

| | |
|---|---|
| H₂O | 32.6 |
| Cyclohexane | 38.1 |
| n-Hexane | 33.3 |
| Benzene | 42.9 |

EXAMPLE 11

A solution of 4.9 grams of $NaAlO_2$ (43.5% $Al_2O_3$, 30% $NaO_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole $Al_2O_3$:

1.1 moles $Na_2O$
30.6 moles $SiO_2$
3.0 moles $(TEA)_2O$
3.25 moles $(CTMA)_2O$
609 moles $H_2O$ The resulting solid product was recovered by filtration, washed with water then calcined at 540° C. for 16 hours in air. The calcined product proved to have a surface area of 1,352 m²/g and the following equilibrium adsorption capacities in grams/100 grams:

| | |
|---|---|
| H₂O | 23.6 |
| Cyclohexane | >50 |
| n-Hexane | 49 |
| Benzene | 67.5 |

The X-ray diffraction pattern of the calcined product may be characterized as including a very strong relative intensity line at 38.5±2.0 Å d-spacing and a weak line at 20.3±1.0 Å. TEM indicated that the product contained the ultra-large pore material.

EXAMPLE 12

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole $Al_2O_3$:

1.25 moles $Na_2O$
27.8 moles $SiO_2$
5.1 moles $(CTMA)_2O$
4.40 moles $(TMA)_2O$
650 moles $H_2O$ The resulting solid product was recovered by filtration and dried in air at ambient temperature. The product was then calcined at 540° C. for 1 hour in nitrogen, followed by 6 hours in air. TEM indicated that this product contained the ultra-large pore material. The X-ray diffraction pattern of the calcined product of this example can be characterized as including a very strong relative intensity line at 44.2±2.0 Å d-spacing and weak lines at 25.2±1.5 and 22.0±1.0 Å.

The calcined product proved to have a surface area of 932 m²/g and the following equilibrium adsorption capacities in grams/100 grams:

| | |
|---|---|
| H₂O | 39.3 |
| Cyclohexane | 46.6 |
| n-Hexane | 37.5 |
| Benzene | 50 |

EXAMPLE 13

Two hundred grams of cetyltrimethylanvnonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole $Al_2O_3$:

1.25 moles $Na_2O$
27.8 moles $SiO_2$
5.1 moles $(CTMA)_2O$
4.4 moles $(TMA)_2O$
650 moles $H_2O$ The resulting solid product was recovered by filtration and dried in air at ambient temperature. The product was then calcined at 540° C. for 1 hour in nitrogen, followed by 6 hours in air. The calcined product proved to have the following equilibrium adsorption capacities in grams/100 grams:

| | |
|---|---|
| H₂O | 35.2 |

| | |
|---|---|
| Cyclohexane | >50 |
| n-Hexane | 40.8 |
| Benzene | 53.5 |

The X-ray diffraction pattern of the calcined product may be characterized as including a very strong relative intensity line at 39.1±2.0 Å d-spacing and weak lines at 22.4±1.0 and 19.4±1.0 Å. TEM indicated that this product contained the ultra-large pore material.

EXAMPLE 14

A mixture of 125 grams of 29% CTMA chloride aqueous solution, 200 grams of water, 3 grams of sodium aluminate (in 50 grams H₂O), 65 grams of Ultrasit, amorphous precipitated silica available from PQ Corporation, and 21 grams NAOH (in 50 grams H₂O) was stirred thoroughly and crystallized at 150° C. for 168 hours. The reaction mixture had the following relative molar composition in terms of moles per mole silica:

0.10 moles (CTMA)$_2$O
21.89 moles H$_2$O
0.036 moles NaAlO$_2$
0.53 moles NAOH

The solid product was isolated by filtration, washed with water, dried for 16 hours at room temperature and calcined at 540° C. for 10 hours in air. The calcined product proved to have a surface area of 840 m²/g, and the following equilibrium adsorption capacities in grams/100 grams:

| | |
|---|---|
| H₂O | 15.2 |
| Cyclohexane | 42.0 |
| n-Hexane | 26.5 |
| Benzene | 62 |

The X-ray diffraction pattern of the calcined product may be characterized as including a very strong relative intensity line at 40.5±2.0 Å d-spacing. TEM indicated that the product contained the ultra-large pore material.

EXAMPLE 15

To make the primary template mixture for this example, 240 grams of water was added to a 92 gram solution of 50% dodecyltrimethylammonium hydroxide, 36% isopropyl alcohol and 14% water such that the mole ratio of Solvent/R$_2$/O was 155. The mole ratio of H$_2$O/R$_2$/O in this mixture was 149 and the IPA/R$_2$/O mole ratio was 6. To the primary template mixture was added 4.15 grams of sodium aluminate, 25 grams of HiSil, 100 grams of aqueous tetramethylamonium silicate solution (10% SiO$_2$) and 13.2 grams of 25% aqueous tetramethylammonium hydroxide solution. The mole ratio of R$_2$/O/(SiO$_2$+Al$_2$O$_3$) was 0.28 for the mixture.

This mixture was stirred at 25° C. for 1 hour. The resulting mixture was then II placed in an autoclave at 100° C. and stirred at 100 rpm for 24 hours. The mixture in the autoclave had the following relative molar composition in terms of moles per mole SiO$_2$:

0.05 mole Na$_2$O
0.036 mole Al$_2$O$_3$
0.18 mole (C$_{12}$TMA)$_2$O
0.12 mole (TMA)$_2$O
36.0 moles H$_2$O
1.0 mole IPA The resulting solid product was recovered by filtration, washed with water and dried in air at ambient temperature. The product was then calcined at 540° C. for 1 hour in nitrogen, followed by 6 hours in air.

The calcined product proved to have a surface area of 1,223 m²/g and the following equilibrium adsorption capacities in grams/100 grams:

| | |
|---|---|
| H₂O | 25.5 |
| Cyclohexane | 41.1 |
| n-Hexane | 35.1 |
| Benzene | 51 |

The X-ray diffraction pattern of the calcined product may be characterized as including a very strong relative intensity line at 30.8±1.5 Å d-spacing and weak lines at 17.9±1.0 and 15.5±1.0 Å. TEM indicated this product to contain the ultra-large pore material.

EXAMPLE 16

A 50.75 gram quantity of decyltrimethylammonium hydroxide (prepared by contacting a ca. 29 wt. % solution of decyltrimethylanvnonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole SiO$_2$:

0.81 mole (C$_{10}$TMA)$_2$O
47.6 moles H$_2$O

The resulting solid product was filtered and washed several times with warm (60°–70° C.) distilled water and with acetone. The final product was calcined to 538° C. in N$_2$/air mixture and then held in air for about 8 hours. The calcined product proved to have a surface area of 915 m²/g and an equilibrium benzene adsorption capacity of 35 grams/100 grams. Argon physisorption data indicated an argon uptake of 0.34 cc/gram, and a pore size of 15 Å.

The X-ray diffraction pattern of the calcined product of this example may be characterized as including a very strong relative intensity line at 27.5±1.5 Å d-spacing and weak lines at 15.8±1.0 and 13.7±1.0 Å. TEM indicated that the product of this example contained the ultra-large pore material.

EXAMPLE 17

To eighty grams of cetyltrimethylammonium hydroxide (CTMAOH) solution prepared as in Example 1 was added 1.65 grams of NaAlO$_2$. The mixture was stirred at room temperature until the NaAlO$_2$ was dissolved. To this solution was added 40 grams of aqueous tetramethylammonium (TMA) silicate solution (10 wt. % SiO$_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole Al$_2$O$_3$:

1.25 moles Na$_2$O
27.8 moles SiO$_2$
5.1 moles (CTMA)$_2$O
2.24 moles (TMA)$_2$O
2256 moles H$_2$O
80.53 moles 1,3,5-trimethylbenzene The resulting product was filtered and washed several times with warm (60°–70° C.) distilled water and with acetone. The final product was calcined to 538° C. in N$_2$/air mixture and then held in air for about 10 hours. The calcined product proved to have an equilbrium benzene adsorption capacity of >25 grams/100 grams.

The X-ray diffraction pattern of the calcined product may be characterized as including a broad, very strong relative intensity line at about 102 Å d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different d values as observed in their electron diffraction patterns. These materials were found to possess d$_{100}$ values between about 85 Å d-spacing and about 120 Å d-spacing.

EXAMPLE 18

To eighty grams of cetyltrimethylammonium hydroxide (CTMAOH) solution prepared as in Example 1 was added 1.65 grams of NaAlO$_2$. The mixture was stirred at room temperature until the NaAlO$_2$ was dissolved. To this solution was added 40 grams of aqueous tetramethylamonium (TMA) silicate solution (10 wt. % SiO$_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole Al$_2$O$_3$:

1.25 moles Na$_2$O
27.8 moles SiO$_2$
5.1 moles (CTMA)$_2$O
2.24 moles (TMA)$_2$O
2,256 moles H$_2$O
132.7 moles 1,3,5-trimethylbenzene The resulting product was filtered and washed several times with warm (60°–70° C.) distilled water and with acetone. The final product was calcined to 538° C. in N$_2$/air mixture and then held in air for about 10 hours. The calcined product proved to have a surface area of 915 m$^2$/g and an equilbrium benzene adsorption capacity of >25 grams/100 grams. Argon physisorption data indicated an argon uptake of 0.95 cc/gram, and a pore size centered on 78 Å (Dollimore-Heal Method, see Example 22(b)), but running from 70 to greater than 105 Angstoms. The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product contained several materials with different d$_{100}$ values as observed in their electron diffraction patterns. These materials were found to possess d$_{100}$ values between about 85 Å d-spacing and about 110 Å d-spacing.

EXAMPLE 19

To eighty grams of cetyltrimethylammonium hydroxide (CTMAOH) solution prepared as in Example 1 was added 1.65 grams of NaAlO$_2$. The mixture was stirred at room temperature until the NaAlO$_2$ was dissolved. To this solution was added 40 grams of aqueous tetramethylaninonium (TMA) silicate solution (10 wt. % SiO$_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole Al$_2$O$_3$:

1.25 moles Na$_2$O
27.8 moles SiO$_2$
5.1 moles (CTMA)$_2$O
2.24 moles (TMA)$_2$O
650 moles H$_2$O
19.9 moles 1,3,5-trimethylbenzene The resulting product was filtered and washed several times with warm (60°–70° C.) distilled water and with acetone. The final product was calcined to 538° C. in N$_2$/air mixture and then held in air for about 8 hours.

The calcined product proved to have a surface area of 975 m$^2$/g and an equilbrium benzene adsorption capacity of >40 grams/100 grams. Argon physisorption data indicated an argon uptake of 0.97 cc/gram, and a pore size of 63 Å (Dollimore-Heal Method), with the peak occurring at P/P$_o$=0.65.

The X-ray diffraction pattern of the calcined product of this example may be characterized as including a very strong relative intensity line at 63±5 Å d-spacing and weak lines at 36.4±2.0, 31.3±1.5 Å and 23.8±1.0 Å d-spacing. TEM indicated that the product of this example contained the ultra-large pore material.

EXAMPLE 20

Argon Physisorption Determination

To determine the pore diameters of the mesoporous products with pores up to about 60 Å in diameter, 0.2 gram samples of the products of Examples 1 through 17 were placed in glass sample tubes and attached to a physisorption apparatus as described in U.S. Pat. No. 4,762,010.

The samples were heated to 300° C. for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibratedi sample volumes were used. (See also S. J. Gregg et al., *Adsorption, Surface Area and Porosity*, 2nd ed., Academic Press, 1982). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure P$_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

The step (inflection) in the isotherm, indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to $\log(P/P_o)$ is formed. The adsorption peak (stated in terms of log $(P/P_o)$) may be related to the physical pore diameter (Å) by the following formula:

$$\log(P/P_o) = \frac{K}{d - 0.38}\left[\frac{S^4}{3(L - D/2)^3} - \frac{S^{10}}{9(L - D/2)^9} - \frac{S^4}{3(D/2)^3} + \frac{S^{10}}{9(D/2)^9}\right]$$

where d=pore diameter in nanometers, K=32.17, S=0.2446, L=d±0.19, and D=0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of ALPO-5 and its known pore size. This method is particularly useful for microporous materials having pores of up to about 60 Å in diameter.

The results of this procedure for the samples from Examples 1 through 17 are tabulated below. The samples from Examples 10, 13 and 15 gave two separate peaks, believed to be the result of two separate ultra-large pore phases in the products.

| Example | Pore Diameter, Å |
|---|---|
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |
| 10 | 22.8, 30.8 |
| 11 | 36.8 |
| 12 | 36.1 |
| 13 | 35.0, 42.1 |
| 14 | 40.0 |
| 15 | 22.4, 30.4 |
| 16 | 15.0 |

The above method of Horvath and Kawazoe for determining pore size from physisorption isotherms was intended to be applied to pore systems of up to 20 Å diameter; but with some care as above detailed, its use can be extended to pores of up to 60 Å diameter.

In the pore regime above 60 Å diameter, the Kelvin equation can be applied. It is usually given as:

$$\ln(P/P_o) = \frac{-2\gamma V}{r_k RT}\cos\theta$$

where:
$\gamma$ = surface tension of sorbate
$V$ = molar volume of sorbate
$\theta$ = contact angle (usually taken for practical reasons to be 0)
$R$ = gas constant
$T$ = absolute temperature
$r_k$ = capillary condensate (pore) radius $P/P_o$ = relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1,000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

In order to illuminate the microstructure of the materials by transmission electromicroscopy (TEM), samples must be thin enough for an electron beam to pass through them, generally about 500–1,000 Å or so thick. The crystal morphology of the present materials usually required that they be prepared for study by ultramicrotomy. While time consuming, this technique of sample preparation is conventional. The materials are embedded in a resin, in this case a commercially available low viscosity acrylic resin L. R. WHITE (hard), which is then cured at about 80° C. for about 1½ hours. Thin sections of the block are cut on an ultramicrotome using a diamond knife and sections in the thickness range 500–1,000 Å are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a white sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDPs are readily produced on modern TEM instruments using, e.g. the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

In order to observe the salient features of the crystalline product of the present invention, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. The number of diffraction spots observed depends to a degree upon the regularity of the crystalline arrangement in the material, among other things. At the very least the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located.

Microtomed samples of materials from the Examples were examined by the techniques described above in a JEOL 200 CX transmission electron microscope operated at 200,000 volts with an effective 2 Å objective aperture in place. The instrument has a point-to-point resolution of 4.5 Å. Other conventional experimental arrangements in high resolution (phase contrast) TEM could be used to produce equivalent images provided care is taken to keep the objective lens on the underfocus (weak leans) side of the minimum contrast lens current setting.

EXAMPLES 21 TO 24

The following examples the coupled two stage process utilizing Pt/MCM-41 as the hydroisomerization catalyst.

EXAMPLE 21

Two slack waxes were subjected to mild hydrocracking over an amorphous catalyst. The waxes were a heavy neutral (450 SUS at 100° C.) slack wax and a high boiling point petrolatum slack wax. The properties of the waxes are shown in Table 5 below (properties of the solvent dewaxed oil also shown). The hydrocracking was carried out over a NiW/fluorided alumina catalyst with the properties shown in Table 6, at 1 hr$^{-1}$ LHSV, 2,000 psig and 5,000 SCF/Bbl H$_2$ circulation. The catalyst was sulfided and fluorided in-situ using o-fluorotoluene at a level of 600 ppm fluorine for one week at a temperature of 725° F. (385° C.) before introducing the petrolatum wax. The hydrocracking was carried out with fluorine maintenance at 25 ppm F using o-fluorotoluene.

TABLE 5

| Wax Feed Properties | | |
|---|---|---|
| | 450N Slack Wax | Bright Stock Petrolatum |
| Nitrogen, ppm | 32 | 120 |
| Sulfur, wt % | 0.10 | 0.32 |
| KV @ 100° C., cS | 7.3 | 18.8 |
| Oil Content, wt. pct. (D3235) | 34 | 25 |
| SIMDIST, wt % | | |
| IBP | 736 | 885 |
| 5 | 805 | 955 |
| 50 | 916 | 1088 |
| 95 | 1037 | 1232 |
| EP | 1095 | 1290 |
| Solvent Dewaxed Oil | | |
| KV @ 100° C., cS | 10.53 | 28.42 |
| VI | 96 | 99 |
| Pour Point, °F. | 0 | 30 |
| Nitrogen, ppm | 95 | 270 |
| Sulfur, wt % | 0.22 | 0.64 |

TABLE 5-continued

| Wax Feed Properties | | |
|---|---|---|
| | 450N Slack Wax | Bright Stock Petrolatum |
| IBP/5% | 731/799 | 743/905 |

TABLE 6

| Properties Of Amorphous HDC Catalyst | |
|---|---|
| Size/Shape | 1/16 inch Trilobe |
| Nickel, wt. pct. | 4.0 |
| Tungsten, wt. pct. | 19.0 |
| Surface Area, m$^2$/gm | 171 |
| Pore Volume, cc/gm | 0.432 |

The reaction severity was adjusted by varying the reaction temperature from 720°–770° F. which resulted in wax conversions of 40 to 75 weight percent. Wax conversion is defined as follows:

$$\text{Wax conversion} = 100 \times \frac{(\text{Wax in Feed} - \text{Wax obtained by Solvent Dewaxing})}{\text{Wax in Feed}}$$

The properties of the total liquid products (TLP) from the hydrocracking are shown in Table 7 below.

TABLE 7

| Properties of Hydrocracked Waxes | | |
|---|---|---|
| | HN Slack Wax | Petrolatum |
| Hydrogen, wt % | 14.63 | 14.76 |
| Nitrogen, ppm | 5.0 | 3.0 |
| Sulfur, wt % | 0.002 | 0.002 |
| API° | 38.2 | 36.8 |
| SIMDIST, wt % | | |
| IBP | 217 | 138 |
| 5 | 443 | 386 |
| 50 | 879 | 979 |
| 95 | 1015 | 1127 |
| EP | 1061 | 1190 |

EXAMPLE 22

NiW/MCM-41 CATALYST PREPARATION

A NiW/MCM-41 catalyst was prepared as described below.

A sample of MCM-41 (40 Å) was prepared by crystallizing the following mixture (parts by weight—pbw) in an autoclave:

61 pbw Cetyltrimethylammonium (CTMA) hydroxide, prepared by contacting a 29 wt. % N,N,N-trimethyl-1-hexadecylammonium chloride solution with a hydroxide-forehalide exchange resin 1 pbw Sodium aluminate, 30 pbw Tetramethylammonim silicate (10% aqueous solution), 8 pbw Precipitated hydrated silica (Hisil, TM).

The mixture was crystallized at 100° C. for 24 hrs. with stirring under autogeneous pressure. The resulting product was recovered by filtration and dried in air at ambient temperature. A sample of the product was calcined at 540° C. for 1 hour in nitrogen, followed by 6 hours in air. The characterisitics of the product were consistent with its identity as MCM-41.

The MCM-41 was exchanged with room temperature aqueous solutions of amonium nitrate and subsequently dried overnight at 250° F. A portion of the resultant crystals was combined with Al$_2$O$_3$ to form a mixture of 65 parts, by weight MCM-41 and 35 parts alumina. Water was added to this mixture to allow the resulting catalyst to be formed into extrudates. The catalyst was activated by calcination at 950° F. in 5v/v/min of nitrogen for 6 hours followed by the replacement of the nitrogen with 5v/v/min of air. The calcination was completed by raising the temperature to 1000° F. and maintaining that temperature in 5v/v/min air for 18 hours. Nickel and tungsten were incorporated by incipient wetness coimpregnation using solutions of Ni(-NO$_3$)$_2 \cdot$6H$_2$O and (NH$_4$)$_6$H$_2$W$_{12}$O$_{40}\cdot$4OH$_2$O. After drying for 12 hours at 250° F., the extrudate was calcined in 5v/v/min air at 1000° F. for 3 hours.

The physical and chemical properties of the NiW/MCM-41/Al$_2$O$_3$ catalyst are set out below:

| | |
|---|---|
| Nickel, wt % | 5.8 |
| Tungsten, wt % | 29.1 |
| Sodium, ppm | 200 |
| Surface Area, m2/g | 242 |
| Packing Density, g/cc | 0.749 |

EXAMPLE 23

This example shows the use of the MCM-41 and amorphous catalysts in the hydrocracking of a wax feed. The feed used in this Example was a heavy neutral (HN) slack wax whose properties are listed in Table 8 below.

TABLE 8

| Properties of Heavy Neutral Slack Wax | |
|---|---|
| Hydrogen, wt % | 14.56 |
| Nitrogen, ppm | 54 |
| Sulfur, wt % | 0.102 |
| API Gravity | 34.9 |
| KV @ 100° C., cS | 7.117 |
| Solvent Extractables, wt % (D3235) | 34.05 |
| Simulated Distillation, °F. | |
| IBP/5 | 736/805 |
| 10/20 | 828/858 |
| 30/40 | 879/898 |
| 50/60 | 916/936 |
| 70/80 | 957/982 |
| 90/EP | 1014/1095 |
| Dewaxed Oil Properties | |
| Nitrogen, ppm | 95 |
| Sulfur, wt % | 0.220 |
| Pour point, °F. | 0 |
| KV @ 40° C., cS | 92.04 |
| KV @ 100° C., cS | 10.53 |
| VI | 96.2 |
| Composition, wt % | |
| Paraffins | 23.2 |
| Mononaphthenes | 19.4 |
| Polynaphthenes | 37.1 |
| Aromatics | 20.3 |

Amorphous HDC Catalyst

The feed was processed over a fixed bed reactor containing NiW/alumina fluorided catalyst that was sulfided and then fluorided in-situ by adding 600 ppm of fluorine as ortho-fluorotoluene in the slack wax feed for approximately one week to target a fluorine level of 2–4 wt % on catalyst. The operating conditions for the run were 2,000 psig hydrogen pressure 1 LHSV and the reactor temperature was varied from 705° to 755° F. to cover a wide conversion range. The total liquid product from the hydrocracking step was then distilled to a nominal 650° F.+ cut-point. The waxy bottoms was then solvent dewaxed to a target 0° F. pour point. The results of these runs are summarized in Table 9 below.

TABLE 9

| Wax Hydrocracking - NiW/Al$_2$O$_3$ Catalyst | | | | | | | |
|---|---|---|---|---|---|---|---|
| Mass Bal. No. | 411 | 412 | 413 | 415 | 416 | 417 | 418 |
| Reactor temp, °F. | 740 | 750 | 755 | 735 | 725 | 715 | 705 |
| 650° F.—Conv, wt % | 28 | 40 | 48 | 23 | 17 | 10 | 9 |
| Lube Properties | | | | | | | |
| KV @ 100° C. | 5.0 | 4.3 | 4.0 | 5.1 | 5.4 | 5.9 | 6.7 |
| VI | 137 | 143 | 140 | 146 | 141 | 137 | 131 |
| Pour Point, °F. | 5 | 0 | −5 | 0 | −5 | 5 | 15 |
| VI @ 0° F. Pour | 136 | 143 | 141 | 146 | 142 | 136 | 128 |
| Lube Yield, wt % | 40 | 43 | 42 | 40 | 34 | 33 | 29 |
| Wax Conversion | 50 | 74 | 84 | 42 | 24 | 12 | 4 |

Boiling point conversion is defined as:

$$650° F.- \text{conversion} = \frac{650° F.+ \text{ in Feed} - 650° F.+ \text{ in Product}}{650° F.+ \text{ in Feed}}$$

Wax Conversion is defined as:

$$\text{Wax Conversion} = \frac{\text{Wt \% Wax in Feed} - (\text{Wt \% Unconverted Wax after Solvent Dewaxing})}{\text{Wt \% Wax in Feed}}$$

NiW/MCM-41 HDC Catalyst

The NiW/MCM-41 catalyst of Example 22 was used for wax hydrocracking at 2,000 psig hydrogen pressure, 7,500 SCF/Bbl hydrogen circulation and 1 LHSV. The operating temperature was adjusted from 720° to 746° F. to span a range of 650° F.- boiling point conversions. The results of these runs are given in Table 10.

TABLE 10

| | Wax HDC | | | | | | | |
|---|---|---|---|---|---|---|---|---|
| | Mass Bal. No. | | | | | | | |
| | 82 | 84 | 85 | 86 | 87 | 88 | 90 | 92 |
| Reactor temp, °F. | 720 | 725 | 725 | 733 | 732 | 740 | 746 | 731 |
| 650° F. - Conv, wt % | 18.4 | 21.5 | 23.6 | 29.2 | 29.8 | 41.1 | 59.5 | 35.6 |
| Lube Properties: | | | | | | | | |
| KV @ 100° | 5.81 | 5.47 | 5.30 | 4.86 | 4.857 | 4.55 | 4.29 | 5.02 |
| VI | 143.6 | 145.7 | 144.3 | 142.8 | 145.7 | 142.0 | 141.3 | 145.6 |
| Pour Point, °F. | 20 | 5 | 5 | 5 | 5 | 10 | 10 | 5 |
| VI @ 0° F. Pour Pt | 139.6 | 144.7 | 143.3 | 141.8 | 144.7 | 140 | 139.3 | 144.6 |
| Lube Yield, wt % | 39.5 | 38.6 | 40.3 | 47.6 | 44.3 | 47.5 | 43.9 | 47.2 |
| Wax Conversion | 42.3 | 49.6 | 42.7 | 65.4 | 68.7 | 81.3 | 84.7 | 65.6 |

The activity of the NiW/MCM-41 is higher than the activity of the fluorided NiW/alumina catatlyst. For example, at 30 wt % 650° F.- conversion, the fluorided catalyst required a 742° F. reactor temperature whereas the MCM-41 catalyst required about 10° F. lower temperature of 732° F. In the boiling point conversion range of about 30–60 wt % 650° F.- conversion or greater, this activity advantage is beneficial in terms of lower start-of-cycle temperature and potentially longer catalyst life.

EXAMPLE 24

Pt/MCM-41 Catalyst Prepartion

A sample of MCM-41 (40 Å) was prepared in accordance with the method described in Example 22 above but using (parts by weight) 48 parts CTMA hydroxide, 1 part sodium aluminate, 2.4 parts tetramethylammonim silicate (10% aqueous solution), and 6 parts precipitated hydrated silica (HiSil TM). The calcined product had a surface area of 1,120 m²/g and the following equilibrium absorption capacities in grams/100 grams:

| | |
|---|---|
| H2O | 10.8 |
| Cyclohexane | >50 |
| n-hexane | >50 |
| Benzene | 67 |

The product was identified as MCM-41 with an X-ray diffraction pattern which included a very strong relative intensity line at 38.4±2.0 Å d-spacing, and weak lines at 22.6±1.0, 20.0±1.0, and 15.2±1.0 Å.

The calcined MCM-41 product was exchanged with room temperature aqueous solutions of ammonium nitrate and was subsequently dried overnight at 250° F.

A portion of the resultant crystals was combined with $Al_2O_3$ to form a mixture of 65 parts by weight MCM-41 and 35 parts alumina. Water was added to this mixture to allow the resulting catalyst to be formed into extrudates. The catalyst was activated by calcination at 950° F. in 5v/v/min nitrogen for 6 hours followed by the replacement of the nitrogen flow with 5v/v/min of air. The calcination was completed by raising the temperature to 1000° F. and maintaining that temperature for 18 hours. Platinum was incorporated by exchange with an aqueous solution of a platinum tetraamine salt. The extrudate was then dried and calcined in air at 660° F. for three hours. The physical and chemical properties of the Pt/MCM-41 catalyst are provided in Table 11 below:

TABLE 11

| Pt/MCM-41 Catalyst Properties | |
|---|---|
| Platinum, wt. pct. | 0.60 |
| Surface Area, m²/g | 690 |
| Particle Density, g/cc | 0.706 |
| Real Density, g/cc | 2.514 |
| Pore Volume, cc/g | 1.019 |

EXAMPLE 25

The total liquid products (TLP) from the slack wax hydrocracking processes described in Example 21 were processed in the presence of hydrogen over the Pt/MCM-41 catalyst of Example 24 at 1.0 LHSV, 2,000 psig, and 5000 SCFB $H_2$. The waxy products were then distilled to a nominal 650° F.+ cut-point. The distilled materials were subsequently dewaxed to 0° F. pour point using a conventional MEK/Toluene dewaxing process. Table 12 below summarizes the yield and product property data. Yield is determined by the amount of Tube material remaining after solvent dewaxing and is based on the feed to the first hydrocracking reactor.

TABLE 12

Processing Of
Hydrocracked Petrolatum Wax Over Pt/MCM-41

| No. | 22-1 | 22-2 | 22-3 | 22-4 | 22-5 |
|---|---|---|---|---|---|
| Temp. | 575 | 620 | 631 | 641 | 617 |
| Wax Convsn. | 43.3 | 71.2 | 77.7 | 84 | 65.6 |
| KV @ 100° C. | 8.503 | 7.923 | 8.438 | 7.589 | 8.442 |
| VI | 140 | 147 | 145 | 144 | 143 |
| Pour Point, °F. | −5 | 10 | 10 | 5 | 10 |
| Lube Yield, wt % | 37 | 43.6 | 39.3 | 35.3 | 40.8 |

Processing of
Hydrocracked Heavy Neutral Wax over Pt/MCM-41

| Number | 22-6 | 22-7 |
|---|---|---|
| Temp., °F. | 618 | 638 |
| Wax Convsn | 71 | 76 |
| KV @ 100° C., cS | 5.32 | 5.024 |
| VI | 145 | 145 |
| Pour Point, °F. | 10 | 15 |
| Lube Yield, wt. pct. | 45 | 41 |

FIG. 1 compares the lube yield vs wax conversion for products from both the single stage hydrocracking (Example 21) and two-stage treatement (Example 25) for the petrolatum slack wax. The yield of low pour point, 8 cS (100° C., nominal) viscosity lubricant is improved by the combined scheme of Example 25 when compared to the single stage scheme of Example 21. The maximum yield from the combined scheme in Example 25 is 42-45 wt. percent which is obtained at 60-70 wt percent wax conversion. This compares very favorably to a maximum 32 wt percent lube yield for the single stage scheme of Example 21 with the same wax.

Figure 2:
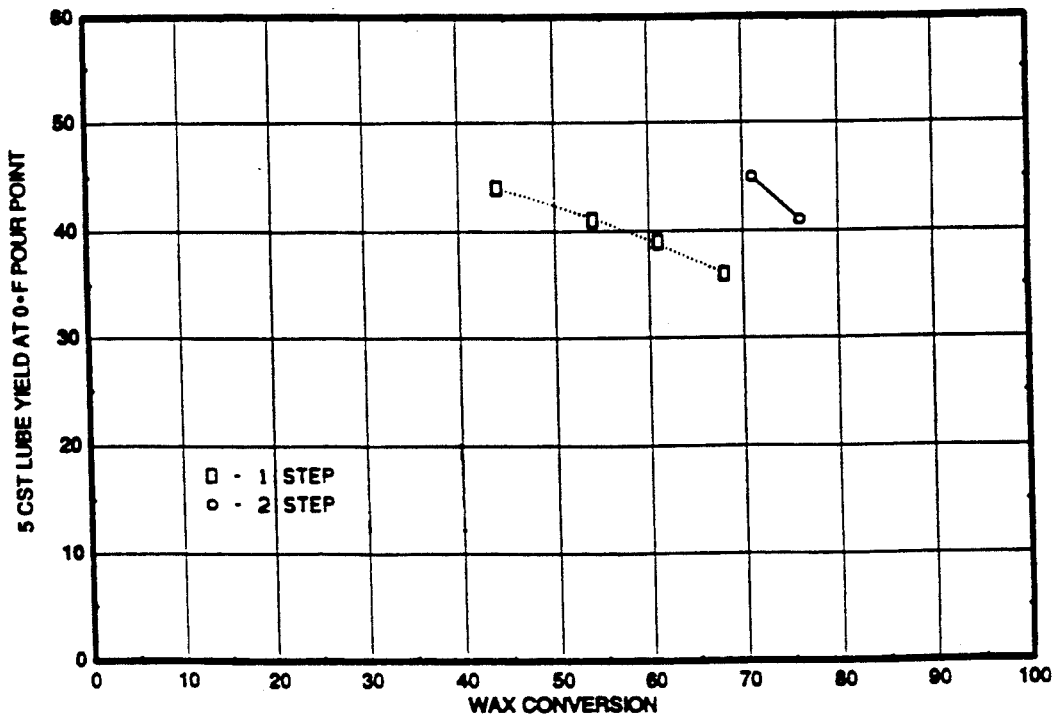

FIG. 2 compares the lube yield vs wax conversion for products from both the single stage hydrocracking (Example 21) and two-stage treatment (Example 25) for the heavy neutral slack wax. The target viscosity for the heavy neutral slack wax feed is 5 cS (100° C.). At high wax conversions, i.e. greater than 50 wt %, the yield of low pour point, 5 cSt (100° C.) viscosity lube is improved by the combined scheme of Example 25 when compared to the single stage scheme of Example 21: the lube yield for the combined scheme in Example 25 is 45 wt. percent obtained at 71 percent wax conversion. This compares very favorably to the 36 wt. percent lube yield obtained for the single stage scheme of Example 21 at 68 wt. percent wax conversion. High wax conversion is very desirable in this process since unconverted wax places additional load on a typically highly loaded commercial MEK dewaxing unit.

We claim:

1. A process for producing a high viscosity index lubricant having a viscosity index of at least 110 from a hydrocarbon feed of mineral oil origin having a wax content of at least 20 weight percent, which comprises:
   (i) hydrocracking the feed over a bifunctional lube hydrocracking catalyst to hydrocrack aromatic components present in the feed at a severity which results in a conversion of not more than 50 weight percent of the feed to products boiling outside the lube boiling range;
   (ii) isomerizing waxy paraffins present in the effluent from the hydrocracking step in the presence of an isomerization catalyst comprising a hydrogenation component on a porous support material comprising an inorganic, non-layered, porous, crystalline phase material which has an arriitgement of uniformly-sized pores with diameters of at least about 13 Å, and after calcination, exhibits a benzene adsorption capacity of greater than about 15 grams benzene per 100 grams at 50 torr and 25° C. and an X-ray diffraction pattern with at least one peak having a relative intensity of 100 at a d-spacing greater than about 18 Å, to isomerize waxy paraffins to less waxy isoparaffins.

2. A process according to claim 1 in which the petroleum wax comprises a slack wax having a wax content of at least 50 weight percent.

3. A process according to claim 2 in which the feed comprises a petroleum wax having the wax content of at least 60 weight percent and an aromatic content of from 5 to 20 weight percent.

4. A process according to claim 3 in which the petroleum wax comprises a slack wax having an aromatic content of from 8 to 12 weight percent.

5. A process according to claim 1 in which the catalyst in the hydrocracking step comprises, as the metal component, at least one metal of Group VIII and at least one metal of Group VI of the Periodic Table.

6. A process according to claim 5 in which the hydrocracking catalyst is an amorphous hydrocracking catalyst.

7. A process according to claim 5 in which the hydrocracking catalyst comprises a hydrogenation component on a porous support material comprising an inorganic, non-layered, porous, crystalline phase material which, after calcination, exhibits a benzene adsorption capacity of greater than about 15 grams benzene per 100 grams at 50 torr and 25° C. and an X-ray diffraction pattern with at least one peak having a relative intensity of at least 100 at a d-spacing greater than about 18 Å.

8. A process acccording to claim 7 in which the crystalline phase material of the hydrocracking catalyst has, after calcination, a hexagonal arrangement of uniformly-sized pores with diameters of at least about 13 Å and exhibits a hexagonal electron diffraction pattern that can be indexed with a $d_{100}$ value greater than about 18 Å.

9. A process according to claim 8 in which the crystalline phase has an X-ray diffraction pattern following calcination with at least one peak whose d-spacing corresponds to the $d_{100}$ value from the electron diffraction pattern.

10. A process according to claim 1 in which the hydrocracking catalyst comprises a hydrogenation component comprising a base metal of Group VIA metal in combination with a base metal of Group VIIIA on the crystalline support.

11. A process according to claim 10 in which the hydrogenation component comprises nickel and tungsten.

12. A process according to claim 1 in which the hydrocracking is carried out at a hydrogen partial pressure of at least 800 psig 13. A process according to claim 1 in which the conversion during the hydrocracking step to 650° F.- material is from 10 to 40 weight percent of the feed.

14. A process acccording to claim 1 in which the crystalline phase material of the isomerization catalyst has, after calcination, a hexagonal arrangement of uniformly-sized pores with diameters of at least about 13 Å and exhibits a hexagonal electron diffraction pattern that can be indexed with a $d_{100}$ value greater than about 18 Å.

15. A process according to claim 14 in which the crystalline phase of the isomerization catalyst has an X-ray diffraction pattern following calcination with at least one peak whose d-spacing corresponds to the $d_{100}$ value from the electron diffraction pattern.

16. A process according to claim 1 in which the crystalline phase of the isomerization catalyst comprises an aluminosilicate.

17. A process according to claim 1 in which the isomerization catalyst comprises a noble metal of Group VIIIA as the metal component on the mesoporous support.

18. A process according to claim 17 in which the isomerization catalyst comprises from 0.3 to 2 weight percent platinum on the mesoporous support material.

19. A process according to claim 1 in which the isomerization step is carried out in the presence of hydrogen at a hydrogen partial pressure of 1,000 to 3,000 psig at a conversion to 650° F.- product of not more than 40 weight percent, based on the feed to the isomerization step.

20. A process according to claim 19 in which the isomerization step is carried out at a temperature not greater than 685° F.

21. A process for producing a high viscosity index lubricant having a viscosity index of at least 140 from a petroleum wax feed having a wax content of at least 50 weight percent, which comprises (i) hydrocracking the petroleum wax feed in a hydrocracking step in the presence of hydrogen at a pressure of at least 1,000 psig in the presence of a hydrocracking catalyst comprising a metal hydrogenation component of at least one metal of Group VIIIA of the Periodic Table and at least one metal of Group VIA of the Periodic Table on support at a temperature of at least 650° F. and at a severity which results in a conversion to 650° F.- products of not more than 40 weight percent based on the petroleum wax feed, (ii) hydroisomerizing the product of the hydrocracking step in the presence of hydrogen at a hydrogen partial pressure of at least 1,000 psig at a temperature from 550° to 700° F. and in the presence of a paraffin isomerization catalyst comprising a noble metal hydrogenation component on a support comprising an inorganic, non-layered, porous, crystalline phase aluminosilicate material having a uniform, hexagonal arrangement of pores with diameters of at least about 13 Å and exhibiting, after calcination, a benzene adsorption capacity of greater than about 15 grams benzene per 100 grams at 50 torr and 25° C., an X-ray diffraction pattern with at least one peak having a relative intensity of 100 at a d-spacing greater than about 18 Å and a hexagonal electron diffraction pattern that can be indexed with a $d_{100}$ value greater than about 18 Å, to isomerize waxy paraffins to less waxy isoparaffins and form a lubricant having a viscosity index of at least 140.

22. A process according to claim 21 in which the catalyst in the hydrocracking step comprises, as the metal component, at least one metal of Group VIIIA and at least one metal of Group VIA of the Periodic Table.

23. A process according to claim 22 in which the hydrogenation component of the hydrocracking catalyst comprises nickel and tungsten.

24. A process according to claim 21 in which the hydrocracking catalyst is an amorphous hydrocracking catalyst.

25. A process according to claim 21 in which the hydrocracking catalyst comprises a hydrogenation component on a porous support material comprising an inorganic, non-layered, porous, crystalline phase material which has, after calcination, a hexagonal arrangement of uniformly-sized pores of at least 13 Å diameter and which exhibits a benzene adsorption capacity of greater than about 15 grams benzene per 100 grams at 50 torr and 25° C. and an X-ray diffraction pattern with at least one peak having a relative intensity of 100 at a d-spacing greater than about 18 Å and a hexagonal electron diffraction pattern that can be indexed with a $d_{100}$ value greater than about 18 Å.

26. A process according to claim 25 in which the crystalline phase of the hydrocracking catalyst has an X-ray diffraction pattern following calcination with at least one peak whose d-spacing corresponds to the $d_{100}$ value from the electron diffraction pattern.

27. A process according to claim 25 in which the crystalline phase of the hydrocracking catalyst is an aluminosilicate.

28. A process according to claim 21 in which the crystalline phase of the isomerization catalyst has an X-ray diffraction pattern following calcination with at least one peak whose d-spacing is greater than about 18 Å which corresponds to the $d_{100}$ value from the electron diffraction pattern.

29. A process according to claim 25 in which the effluent from the hydrocracking step is cascaded directly to the hydroisomerization step.

30. A process according to claim 25 in which the 650° F.+ conversion in the hydrocracking step is from 10 to 40 weight percent based on the petroleum wax feed.

31. A process according to claim 21 in which the 650° F.+ conversion during the isomerization step is from 10 to 30 weight percent based on the feed to the isomerization step.

32. A process according to claim 31 in which the 650° F.+ conversion during the isomerization step is from 10 to 25 weight percent based on the feed to the isomerization step.

33. A process according to claim 21 in which the hydrocracking step is carried out at a hydrogen partial pressure of 1,500 to 2500 psig.

34. A process according to claim 21 in which the isomerization step is carried out at a temperature from 600° to 650° F.

35. A process according to claim 21 in which the hydroisomerized product is subjected to a dewaxing to achieve a target pour point, with a loss during the dewaxing of not more than 20 weight percent.

36. A process according to claim 21 in which the product has a VI of 143 to 147.

37. A process for producing a high viscosity index lubricant having a viscosity index of at least 140 from a petroleum wax feed having a wax content of at least 50 weight percent, which comprises:

(i) hydrocracking the petroleum wax feed in a hydrocracking step in the presence of hydrogen at a pressure of at least 1,000 psig in the presence of a hydrocracking catalyst comprising a metal hydrogenation component of at least one metal of Group VIIIA of the Periodic Table and at least one metal of Group VIA of the Periodic Table on an amorphous, porous alumina support in the presence of a halogen promoter at a temperature of at least 650° F. and at a severity which results in a conversion to 650° F.- products of not more than 30 weight percent based on the petroleum wax feed, (ii) hydroisomerizing the product of the hydrocracking step in the presence of hydrogen at a hydrogen partial pressure of at least 1,000 psig, at a temperature from 600° to 685° F. and in the presence of a paraffin isomerization catalyst comprising a noble metal hydrogenation component on a support comprising an inorganic, non-layered, porous, crystalline phase aluminosilicate material which exhibits a benzene adsorption capacity of greater than about 15 grams benzene per 100 grams at 50 torr and 25° C. and which has a uniform, hexagonal arrangement of pores with diameters of at least about 13 Å and exhibiting, after calcination, an X-ray diffraction pattern with at least one peak having a relative intensity of 100 at a d-spacing greater than about 18 Å and a hexagonal electron diffraction pattern that can be indexed with a $d_{100}$ value greater than about 18 Å which corresponds to the d-spacing of at least one peak in the X-ray diffraction pattern, to isomerize waxy paraffins to less waxy isoparaffins and form a lubricant having a viscosity index of at least 140.

38. A process according to claim 37 in which the 650° F.+ conversion in the hydrocracking step is from 10 to 30 weight percent based on the petroleum wax feed.

39. A process for producing a high viscosity index lubricant having a viscosity index of at least 140 from a petroleum wax feed having a wax content of at least 50 weight percent, which comprises:

(i) hydrocracking the petroleum wax feed in a hydrocracking step in the presence of hydrogen at a pressure of at least 1,000 psig in the presence of a hydrocracking catalyst comprising a metal hydrogenation component of at least one metal of Group VIIIA of the Periodic Table and at least one metal of Group VIA of the Periodic Table on a crystalline support material in the presence of a halogen promoter at a temperature of at least 650° F. and at a severity which results in a conversion to 650° F.- products of not more than 40 weight percent based on the petroleum wax feed, the crystalline support material comprising an inorganic, non-layered, porous, crystalline phase aluminosilicate material which exhibits a benzene adsorption capacity of greater than about 15 grams benzene per 100 grams at 50 torr and 25° C. and which has a uniform, hexagonal arrangement of pores with diameters of at least about 13 Å and exhibiting, after calcination, an X-ray diffraction pattern with at least one peak having a relative intensity of 100 at a d-spacing greater than about 18 Å and a hexagonal electron diffraction pattern that can be indexed with a $d_{100}$ value greater than about 18 Å which corresponds to the d-spacing of at least one peak in the X-ray diffraction pattern, (ii) hydroisomerizing the product of the hydrocracking step in the presence of hydrogen at a hydrogen partial pressure of at least 1,000 psig at a temperature from 600° to 685° F. and in the presence of a paraffin isomerization catalyst comprising a noble metal hydrogenation component on a support comprising an inorganic, non-layered, porous, crystalline phase aluminosilicate material which exhibits a benzene adsorption capacity of greater than about 15 grams benzene per 100 grams at 50 torr and 25° C. and which has a uniform, hexagonal arrangement of pores with diameters of at least about 13 Å and exhibiting, after calcination, an X-ray diffraction pattern with at least one peak having a relative intensity of 100 at a d-spacing greater than about 18 Å and a hexagonal electron diffraction pattern that can be indexed with a $d_{100}$ value greater than about 18 Å which corresponds to the d-spacing of at least one peak in the X-ray diffraction pattern, to isomerize waxy paraffins to less waxy isoparaffins and form a lubricant having a viscosity index of at least 140.

40. A process according to claim 39 in which the 650° F.+ conversion in the hydrocracking step is from 10 to 30 weight percent based on the petroleum wax feed.

* * * * *